(12) United States Patent
Fukuda et al.

(10) Patent No.: US 8,887,219 B2
(45) Date of Patent: Nov. 11, 2014

(54) INFORMATION PROVIDING APPARATUS, INFORMATION RECEIVING TERMINAL, INFORMATION PROVIDING SYSTEM, INFORMATION PROVIDING METHOD AND PROGRAM

(75) Inventors: Kazuhiro Fukuda, Kanagawa (JP); Tetsuo Maruyama, Tokyo (JP); Ippei Tambata, Kanagawa (JP); Daisuke Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 1056 days.

(21) Appl. No.: 12/179,987

(22) Filed: Jul. 25, 2008

(65) Prior Publication Data
US 2009/0063569 A1  Mar. 5, 2009

(30) Foreign Application Priority Data

Sep. 5, 2007  (JP) .................................. 2007-230455

(51) Int. Cl.
*H04N 7/10* (2006.01)
*H04N 7/025* (2006.01)
(Continued)

(52) U.S. Cl.
CPC ......... *H04N 5/44543* (2013.01); *H04N 21/435* (2013.01); *H04N 21/2668* (2013.01); *H04N 21/482* (2013.01); *H04N 21/26603* (2013.01); *H04N 21/235* (2013.01); *H04N 21/44222* (2013.01); *H04N 21/2362* (2013.01); *H04N 21/4828* (2013.01); *H04N 21/8133* (2013.01); *H04N 21/4345* (2013.01); *H04N 60/74* (2013.01); *H04N 21/4722* (2013.01); *H04N 21/23602* (2013.01); *H04N 21/4821* (2013.01)

USPC ................... 725/95; 725/34; 725/93; 725/98; 725/103

(58) Field of Classification Search
USPC ........................................ 725/74–104, 37–61
See application file for complete search history.

(56) References Cited

U.S. PATENT DOCUMENTS 6,769,127 B1 * 7/2004 Bonomi et al. .................. 725/39
8,312,504 B2 * 11/2012 Carlucci et al. ............... 725/145
(Continued)

FOREIGN PATENT DOCUMENTS

EP  1 482 735 A1  12/2004
EP  1 826 981 A1  8/2007
(Continued)

*Primary Examiner* — Mushfikh Alam
(74) *Attorney, Agent, or Firm* — Oblon, Spivak, McClelland, Maier & Neustadt, L.L.P.

(57) ABSTRACT

There is provided an information providing apparatus including an ECG scenario storage portion to store an ECG scenario related to a program in association with reference ID, an ECG package storage portion to store reference IDs of ECG scenarios related to programs in association with discrimination ID of an ECG channel allocated to an ECG package in order to provide a collection of information related to programs having a relationship as an ECG package, an ECG package providing portion to acquire discrimination ID of a particular channel from a receiving terminal, extract an ECG package corresponding to the acquired discrimination ID and provide it to the receiving terminal, and an ECG scenario providing portion to acquire reference ID of a particular ECG scenario included in the ECG package from the receiving terminal, extract an ECG scenario corresponding to the acquired reference ID and provide it to the receiving terminal.

17 Claims, 23 Drawing Sheets

(51) Int. Cl.

| | | |
|---|---|---|
| *H04N 7/173* | (2011.01) | |
| *H04N 21/435* | (2011.01) | |
| *H04N 21/2668* | (2011.01) | |
| *H04N 21/482* | (2011.01) | |
| *H04N 21/266* | (2011.01) | |
| *H04N 21/235* | (2011.01) | |
| *H04N 21/442* | (2011.01) | |
| *H04N 21/2362* | (2011.01) | |
| *H04N 21/81* | (2011.01) | |
| *H04N 5/445* | (2011.01) | |
| *H04N 21/434* | (2011.01) | |
| *H04N 21/4722* | (2011.01) | |
| *H04N 21/236* | (2011.01) | |

(56) References Cited

U.S. PATENT DOCUMENTS

| | | | |
|---|---|---|---|
| 2002/0112249 A1 | 8/2002 | Hendricks et al. | |
| 2003/0023989 A1* | 1/2003 | Chevallier et al. | 725/153 |
| 2004/0117817 A1* | 6/2004 | Kwon et al. | 725/31 |
| 2004/0148628 A1* | 7/2004 | Mears | 725/43 |
| 2005/0108770 A1* | 5/2005 | Karaoguz et al. | 725/131 |
| 2006/0031880 A1* | 2/2006 | Stark et al. | 725/45 |
| 2006/0053450 A1* | 3/2006 | Saarikivi et al. | 725/46 |
| 2006/0085815 A1* | 4/2006 | Nguyen-Tran | 725/34 |
| 2007/0061860 A1* | 3/2007 | Walker et al. | 725/117 |
| 2007/0157230 A1* | 7/2007 | Mardirossian | 725/35 |
| 2007/0199036 A1* | 8/2007 | Coppens et al. | 725/114 |
| 2008/0077958 A1* | 3/2008 | Ward et al. | 725/42 |
| 2008/0092168 A1* | 4/2008 | Logan et al. | 725/44 |
| 2008/0141307 A1* | 6/2008 | Whitehead | 725/46 |
| 2008/0178219 A1* | 7/2008 | Grannan | 725/41 |
| 2008/0184302 A1* | 7/2008 | Knudson et al. | 725/40 |
| 2008/0295142 A1* | 11/2008 | Lee et al. | 725/127 |
| 2011/0209170 A1* | 8/2011 | Schein et al. | 725/14 |
| 2011/0209174 A1* | 8/2011 | Kikinis et al. | 725/27 |
| 2012/0110622 A1* | 5/2012 | Vermola | 725/50 |

FOREIGN PATENT DOCUMENTS

| | | |
|---|---|---|
| JP | 2004-30301 | 1/2004 |
| JP | 2004-102767 | 4/2004 |
| JP | 2005-71050 | 3/2005 |
| WO | WO 2004/073306 A2 | 8/2004 |
| WO | WO 2006/109651 A1 | 10/2006 |
| WO | WO 2007/078757 A2 | 7/2007 |

\* cited by examiner

FIG.8A

```xml
<program id="P00001" name="PROFESSIONAL STYLE" genre="DOCUMENTARY" keywords="AAAAAA  BBBBBB  KNOW-HOW  IMPRESSION" relation_ref ="sc00001" >
<oa start_date="2007/7/10" start_time="22:00:00" end_date="2007/7/10" end_time="23:00:00">
    <details>
        <CreditsList>
            <Person id="1_1" name="AAAAAA"  Birthplace="Japan"/>
            <Person id="1_2" name="BBBBBB"  Birthplace="Japan"/>
            <Person id="1_3" name="CCCCCC"  Birthplace="Japan"/>
        </CreditsList>
    </details>
</oa>
</program>
```

FIG.8B

```xml
<content id="C00001" name="PRODUCT 1" genre="PUBLICATION" keywords="XXX YYY ZZZ" maker="zony" price="100 YEN" content_info="www.zony.co.jp" />
```

FIG.9A

```
<ecg_scenario id="sc00001" name="ECG SCENARIO" start_date="2007/7/1" start_time="00:00:00" end_date="2007/7/20" end_time="00:00:00" memo=
"BROADCAST TIME 2007/7/10 22:00 TO 23:00" >
    <ecg_set_content id="ecg_set_c1" ecg_set_id="es00001" />
    <ecg_set_content id="ecg_set_c2" ecg_set_id="es00002" />
</ecg_scenario>
```

FIG.9B

```
<ecg_set id="es00001" name="ECG SET 1" start_date="2007/7/1" start_time="00:00:00" end_date="2007/7/20" end_time="00:00:00" >
    <content id="c11" type="program" program_id="P011" start_date="2007/7/1" start_time="00:00:00" end_date="2007/7/10" end_time="22:00:00" />
    <content id="c12" type="program" program_id="P012" start_date="2007/7/10" start_time="22:00:00" end_date="2007/7/10" end_time="23:00:00" />
    <content id="c13" type="program" program_id="P013" start_date="2007/7/10" start_time="23:00:00" end_date="2007/7/20" end_time="00:00:00" />
    <content id="c14" type="product" content_id="C011" start_date="2007/7/1" start_time="00:00:00" end_date="2007/7/20" end_time="00:00:00" />
</ecg_set>
```

FIG.9C

```
<ecg_set id="es00002" name="ECG SET 2" start_date="2007/7/1" start_time="00:00:00" end_date="2007/7/20" end_time="00:00:00" >
    <content id="c21" type="program" program_id="P021" start_date="2007/7/1" start_time="00:00:00" end_date="2007/7/10" end_time="23:00:00" />
    <content id="c22" type="program" program_id="P022" start_date="2007/7/10" start_time="23:00:00" end_date="2007/7/20" end_time="00:00:00" />
    <content id="c23" type="product" content_id="C021" start_date="2007/7/1" start_time="00:00:00" end_date="2007/7/20" end_time="00:00:00" />
</ecg_set>
```

FIG.14A

```
<ecg_package id="package01" name="ECG PACKAGE 1" channel_name="WORLD ATHLETICS" start_date="2007/7/1" start_time="00:00:00" end_date=
"2007/7/20" end_time="00:00:00" select_mode="FLAG" memo="METADATA OF PACKAGE 1" >
    <ecg_scenario_content id="ecg_scenario_c1" ecg_scenario_id="sc00001" />
    <ecg_ad_content id ="ecg_ad_content_c1" ref_ecg_ad_content="ad00111" />
    <ecg_scenario_content id="ecg_scenario_c2" ecg_scenario_id="sc00002" />
    <ecg_ad_content id ="ecg_ad_content_c2" ref_ecg_ad_content="ad00112" />
</ecg_package>
```

FIG.14B

```
<ecg_scenario id="sc00001" name="ECG SCENARIO 1" start_date="2007/7/1" start_time="00:00:00" end_date="2007/7/20" end_time="00:00:00"
memo="METADATA OF SCENARIO 1" >
    <ecg_set_content id="ecg_set_c1" ecg_set_id="es00001" />
    <ecg_set_content id="ecg_set_c2" ecg_set_id="es00002" />
</ecg_scenario>
```

FIG.14C

```
<ecg_scenario id="sc00002" name="ECG SCENARIO 2" start_date="2007/7/1" start_time="00:00:00" end_date="2007/7/20" end_time="00:00:00"
memo="METADATA OF SCENARIO 2" >
    <ecg_set_content id="ecg_set_c3" ecg_set_id="es00003" />
    <ecg_set_content id="ecg_set_c4" ecg_set_id="es00004" />
</ecg_scenario>
```

FIG.15A

```xml
<ad id="ad00111" name="ADVERTISEMENT 1" start_date="2007/7/1" start_time="00:00:00" end_date="2007/7/20" end_time="00:00:00" />
<advertiser person_name="MAKER A" lang="japanese" logo_image_file="aaa.jpg" />
<advertisingAgency company_name="ADVERTISING AGENCY A" />
<adProductionCompany company_name="PRODUCTION A" />
<purchaseList>
<purchaseItem id="item1" name="SWEET 1" genre="foods" price="100" image="i1.jpg" />
<purchaseItem id="item2" name="SWEET 2" genre="foods" price="120" image="i2.jpg" />
<purchaseItem id="item3" name="SWEET 3" genre="foods" price="150" image="i3.jpg" />
</purchaseList>
</ad>
```

FIG.15B

```xml
<ecg_set id="es00001" name="ECG SET 1" start_date="2007/7/1" start_time="00:00:00" end_date="2007/7/20" end_time="00:00:00" >
<content id="c11" type="program" program_id="P011" start_date="2007/7/10" start_time="00:00:00" end_date="2007/7/10" end_time="22:00:00" package_flag="TRUE"/>
<content id="c12" type="program" program_id="P012" start_date="2007/7/10" start_time="22:00:00" end_date="2007/7/10" end_time="23:00:00" />
<content id="c13" type="program" program_id="P013" start_date="2007/7/10" start_time="23:00:00" end_date="2007/7/20" end_time="00:00:00" />
<content id="c14" type="product" content_id="C011" start_date="2007/7/1" start_time="00:00:00" end_date="2007/7/20" end_time="00:00:00" />
</ecg_set>
```

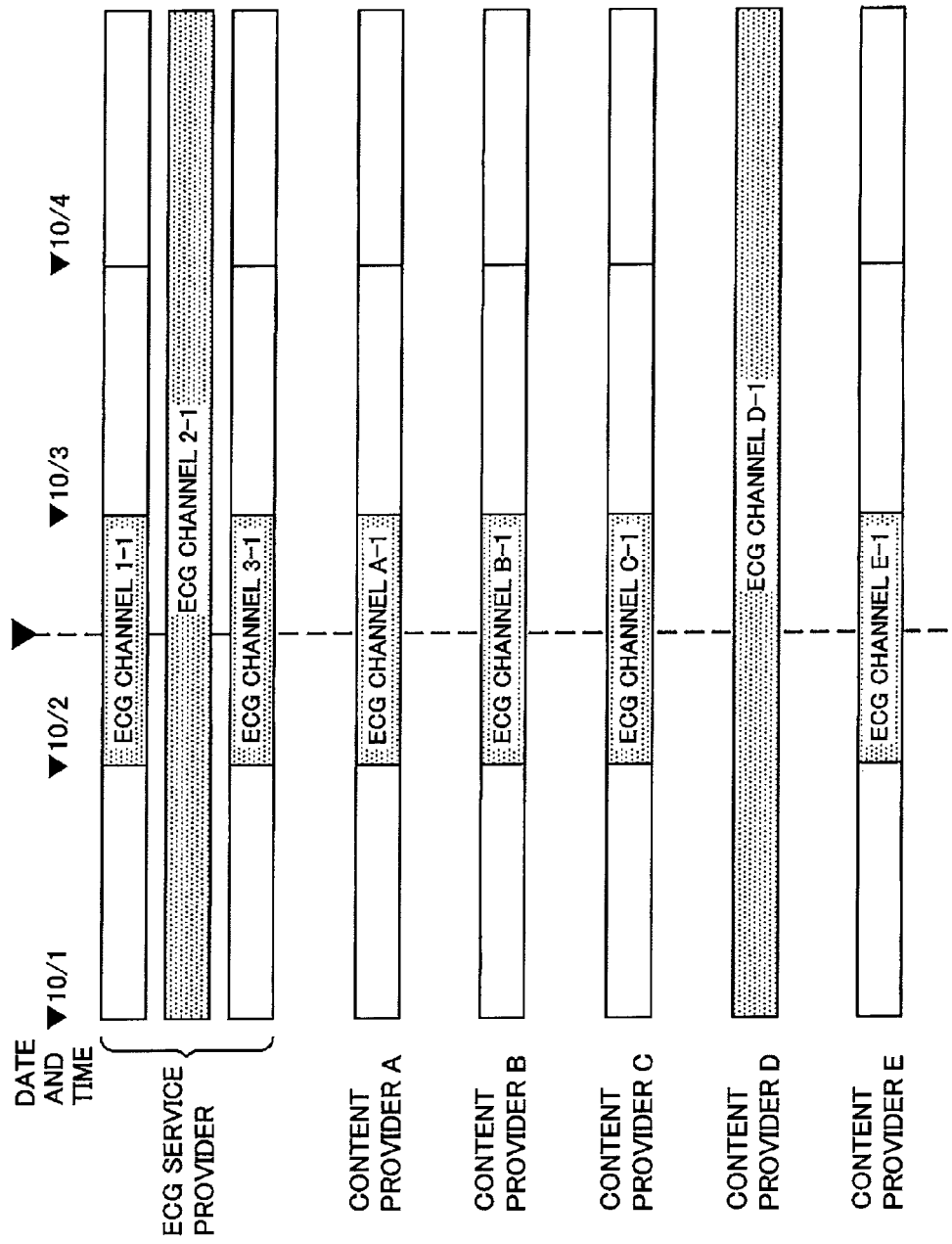

INFORMATION PROVIDING APPARATUS, INFORMATION RECEIVING TERMINAL, INFORMATION PROVIDING SYSTEM, INFORMATION PROVIDING METHOD AND PROGRAM

CROSS REFERENCES TO RELATED APPLICATIONS

The present invention contains subject matter related to Japanese Patent Application JP 2007-230455 filed in the Japan Patent Office on Sep. 5, 2007, the entire contents of which being incorporated herein by reference.

BACKGROUND OF THE INVENTION

1. Field of the Invention

The present invention relates to an information providing apparatus, an information receiving terminal, an information providing system, an information providing method and a program.

2. Description of the Related Art

Recently, a system in which content (program) providers provide video/audio information concerning a program, and a user receives the video/audio information using a receiving terminal and views it has been widespread. A user of such a system generally performs desired operation such as viewing or recording of a program after obtaining and browsing information related to a program using a program guide which appears in a newspaper, a magazine or the like, a program guide which is provided via the internet and so on. Further, a user may obtain and browse information about a program by receiving electronic program guide-service information (EPG-SI) which is provided together with video/audio information of a program or text information which is provided as rich site summary (RSS) and so on.

SUMMARY OF THE INVENTION

However, the information related to a program which is obtained in an existing method as described above has issues such as that it is not user-friendly, information is not updated on time, information is not visual and on, and it is basically provided on a program basis.

On the other hand, when browsing information related to a program, a user may wish to collectively browse information related to a plurality of programs having some relationship with each other, such as programs provided currently, programs provided regularly and programs provided irregularly, for example. In such a case, it is necessary in the existing method to separately obtain and browse information related to each of programs having a relationship with each other, and therefore a user needs to perform complicated operation and cannot effectively browse information related to a plurality of program.

Further, a program provider may wish to collectively provide information related to a plurality of programs having a relationship with each other to a user in order to prompt a user to view a program, view an advertisement associated with a program and so on. In such a case, because information related to a program is basically provided on a program basis in the existing method, a program provider cannot effectively provide information related to a plurality of programs to a user.

It is desirable to provide an information providing apparatus, an information receiving terminal, an information providing system, an information providing method and a program which can provide information related to a plurality of programs having a relationship with each other efficiently and effectively.

According to a first embodiment of the present invention, there is provided an information providing apparatus connected with an information receiving terminal that acquires information related to a program via a communication network, to provide information related to a program to the information receiving terminal. The information providing apparatus includes a scenario information storage portion to store scenario information related to a program in association with reference information, a package information storage portion to store reference information of a plurality of pieces of scenario information related to a plurality of programs in association with identification information of a channel allocated to package information in order to provide a collection of information related to a plurality of programs having a relationship with each other as package information, a package information providing portion to acquire identification information of a particular channel from the information receiving terminal, extract package information corresponding to the acquired identification information from the package information storage portion, and provide the extracted package information to the information receiving terminal, and a scenario information providing portion to acquire reference information of particular scenario information included in the package information from the information receiving terminal, extract scenario information corresponding to the acquired reference information from the scenario information storage portion, and provide the extracted scenario information to the information receiving terminal.

In this configuration, the information providing apparatus stores scenario information related to a program in association with reference information. Further, the information providing apparatus stores reference information of a plurality of pieces of scenario information related to a plurality of programs having a relationship with each other in association with identification information of a channel allocated to package information. Then, the information providing apparatus provides package information corresponding to identification information of a particular channel which is acquired from the information receiving terminal to the information receiving terminal, and provides scenario information corresponding to reference information of particular scenario information which is acquired from the information receiving terminal to the information receiving terminal. A program provider can thereby make the information providing apparatus provide package information through a particular channel and effectively provide a plurality of pieces of scenario information related to a plurality of programs to a user based on reference information of scenario information which is included in the package information.

The information providing apparatus may be connected with an advertising information managing apparatus to store advertising information to be provided as a part of the package information in association with reference information via a communication network, and the package information storage portion may store reference information of the advertising information to be provided as a part of the package information in association with identification information of the channel allocated to the package information in order for the information receiving terminal to acquire particular advertising information from the advertising information managing apparatus based on reference information of the advertising information included in the package information acquired by the information receiving terminal. A program provider can thereby make the information providing apparatus provide package information through a particular channel and effectively provide advertising information associated with a plurality of programs to a user based on reference information of advertising information which is included in the package information.

The information providing apparatus may further include a package information producing portion to produce package information in order to provide a collection of information related to the plurality of programs having a relationship with each other as package information. A program provider can thereby make the information providing apparatus to produce package information and effectively provide information related to a plurality of programs to a user.

The package information storage portion may store the package information produced by a program provider that provides a program. A program provider can thereby produce package information by itself and effectively provide information related to a plurality of programs to a user through the information providing apparatus.

The package information storage portion may store reference information of the plurality of pieces of scenario information related to the plurality of programs provided from different program providers in association with identification information of the channel allocated to the package information. It is thereby possible to effectively provide information related to a plurality of programs which are provided from different program providers.

The information providing apparatus may further include a channel managing portion to manage a channel allocated to the package information. It is thereby possible to efficiently manage a channel allocated to package information according to program scheduling.

The information providing apparatus may further include a related item extracting portion to extract a common related item from the plurality of pieces of scenario information related to the plurality of programs, and the package information storage portion may store reference information of advertising information acquired as advertising information corresponding to the related item in association with identification information of the channel allocated to the package information. It is thereby possible to efficiently and effectively provide advertising information related to a plurality of programs to a user.

The scenario information may be edited so that a plurality of pieces of information related to a program are displayed sequentially. It is thereby possible to effectively provide a plurality of pieces of information related to a program to a user.

According to a second embodiment of the present invention, there is provided an information receiving terminal connected with an information providing apparatus that stores scenario information related to a program in association with reference information and stores reference information of a plurality of pieces of scenario information related to a plurality of programs in association with identification information of a channel allocated to package information in order to provide a collection of information related to a plurality of programs having a relationship with each other as package information, via a communication network, to acquire information related to a program from the information providing apparatus. The information receiving terminal includes a package information acquiring portion to acquire the package information provided through a particular channel from the information providing apparatus based on identification information of the channel, a scenario information acquiring portion to acquire particular scenario information from the information providing apparatus based on reference information of the scenario information included in the acquired package information, and a display/playback control portion to control display of acquired information.

In this configuration, the information receiving terminal acquires package information which is provided through a particular channel from the information providing apparatus based on identification information of the channel, acquires particular scenario information from the information providing apparatus based on reference information of the scenario information which is included in the package information, and controls display of acquired information. A user can thereby acquire package information through a particular channel and efficiently browse a plurality of pieces of scenario information related to a plurality of programs based on reference information of the scenario information which is included in the package information.

The information receiving terminal may be connected with an advertising information managing apparatus to store advertising information to be provided as a part of the package information in association with reference information via a communication network, and the information receiving terminal may further include an advertising information acquiring portion to acquire particular advertising information from the advertising information managing apparatus based on reference information of the advertising information included in the acquired package information. A user can thereby acquire package information through a particular channel and efficiently browse advertising information associated with a plurality of programs based on reference information of the advertising information which is included in the package information.

A plurality of pieces of package information may be provided by the information providing apparatus through a plurality of channels, and the information receiving terminal may further include a channel selecting portion to select a particular channel from the plurality of channels. In this configuration, a user can browse package information which is provided through a particular channel.

The information receiving terminal may further include a preference information storage portion to store preference information of a user, and a channel sorting portion to sort out a channel to provide package information corresponding to the preference information based on the scenario information included in the package information. A user can thereby efficiently browse package information which matches the preference information.

The scenario information may include a plurality of pieces of information related to a program, and particular information of the plurality of pieces of information included in the scenario information may be preset as information representing the scenario information, and the display/playback control portion may control display of acquired information so as to sequentially display information representing each scenario information of a plurality of pieces of scenario information included in package information provided through a particular channel. A user can thereby browse particular information which represents each scenario information efficiently for each scenario information.

The scenario information may be edited so that a plurality of pieces of information related to a program are displayed sequentially. A user can thereby efficiently browse a plurality of pieces of information related to a program.

According to a third embodiment of the present invention, there is provided an information providing system where an information providing apparatus that provides information related to a program and an information receiving terminal that acquires information related to a program from the information providing apparatus are connected via a communication network. In this information providing system, the information providing apparatus includes a scenario information storage portion to store scenario information related to a program in association with reference information, a package information storage portion to store reference information of a plurality of pieces of scenario information related to a plurality of programs in association with identification information of a channel allocated to package information in order to provide a collection of information related to a plurality of programs having a relationship with each other as package information, a package information providing portion to acquire identification information of the channel from the information receiving terminal, extract package information corresponding to the acquired identification information from the package information storage portion, and provide the extracted package information to the information receiving terminal, and a scenario information providing portion to acquire reference information of the scenario information from the information receiving terminal, extract scenario information corresponding to the acquired reference information from the scenario information storage portion and provide the extracted scenario information to the information receiving terminal. The information receiving terminal includes a package information acquiring portion to acquire the package information provided through a particular channel from the information providing apparatus based on identification information of the channel, a scenario information acquiring portion to acquire particular scenario information from the information providing apparatus based on reference information of the scenario information included in the acquired package information, and a display/playback control portion to control display of acquired information.

In this configuration, the information providing apparatus stores scenario information related to a program in association with reference information. Further, the information providing apparatus stores reference information of a plurality of pieces of scenario information related to a plurality of programs having a relationship with each other in association with identification information of a channel allocated to package information. Then, the information receiving terminal acquires package information which is provided through a particular channel from the information providing apparatus based on identification information of the channel, acquires particular scenario information from the information providing apparatus based on reference information of the scenario information which is included in the package information, and controls display of acquired information. A user can thereby acquire package information through a particular channel and efficiently browse a plurality of pieces of scenario information related to a plurality of programs based on reference information of the scenario information which is included in the package information. Further, a program provider can thereby make the information providing apparatus provide package information through a particular channel and effectively provide a plurality of pieces of scenario information related to a plurality of programs to a user based on reference information of scenario information which is included in the package information.

The information providing system may further include an advertising information managing apparatus connected with the information providing apparatus and the information receiving terminal via a communication network, to store advertising information to be provided as a part of the package information in association with reference information, the package information storage portion may store reference information of the advertising information to be provided as a part of the package information in association with identification information of the channel allocated to the package information, and the information receiving terminal may further include an advertising information acquiring portion to acquire particular advertising information from the advertising information managing apparatus based on the reference information of the advertising information included in the acquired package information. A user can thereby acquire package information through a particular channel and efficiently browse advertising information associated with a plurality of programs based on reference information of the advertising information which is included in the package information. Further, a program provider can thereby make the information providing apparatus provide package information through a particular channel and effectively provide advertising information associated with a plurality of programs to a user based on reference information of advertising information which is included in the package information.

According to a fourth embodiment of the present invention, there is provided an information providing method applied to an information providing system where an information providing apparatus that provides information related to a program and an information receiving terminal that acquires information related to a program from the information providing apparatus are connected via a communication network. The method includes the steps, which is performed by the information providing apparatus, of storing scenario information related to a program in association with reference information, storing reference information of a plurality of pieces of scenario information related to a plurality of programs in association with identification information of a channel allocated to package information in order to provide a collection of information related to a plurality of programs having a relationship with each other as package information, acquiring identification information of a particular channel from the information receiving terminal, extracting package information corresponding to the acquired identification information and providing the extracted package information to the information receiving terminal, and acquiring reference information of particular scenario information included in the package information from the information receiving terminal, extracting scenario information corresponding to the acquired reference information and providing the extracted scenario information to the information receiving terminal.

According to a fifth embodiment of the present invention, there is provided a program which causes a computer to function as the information providing apparatus according to the first embodiment of the present invention.

According to a sixth embodiment of the present invention, there is provided a program which causes a computer to function as the information receiving terminal according to the second embodiment of the present invention.

According to the embodiments of the present invention described above, it is possible to provide an information providing apparatus, an information receiving terminal, an information providing system, an information providing method and programs which can provide information related to a plurality of programs having a relationship with each other efficiently and effectively.

BRIEF DESCRIPTION OF THE DRAWINGS

FIG. 8A is an explanatory view showing an example of metadata (program information) which constitutes an ECG scenario.

FIG. 8B is an explanatory view showing an example of metadata (related information) which constitutes an ECG scenario.

FIG. 9A is an explanatory view showing an example of metadata (ECG scenario) which constitutes an ECG scenario.

FIG. 9B is an explanatory view showing an example of metadata (ECG set) which constitutes an ECG scenario.

FIG. 9C is an explanatory view showing an example of metadata (ECG set) which constitutes an ECG scenario.

FIG. 14A is an explanatory view showing an example of metadata (ECG package) which constitutes an ECG package.

FIG. 14B is an explanatory view showing an example of metadata (ECG scenario) which constitutes an ECG package.

FIG. 14C is an explanatory view showing an example of metadata (ECG scenario) which constitutes an ECG package.

FIG. 15A is an explanatory view showing an example of metadata (advertising information) which constitutes an ECG package.

FIG. 15B is an explanatory view showing an example of metadata (ECG set) which constitutes an ECG package.

FIG. 16 is an explanatory view showing the structure of an ECG channel which provides an ECG package.

DETAILED DESCRIPTION OF THE PREFERRED EMBODIMENTS

Figure 1:
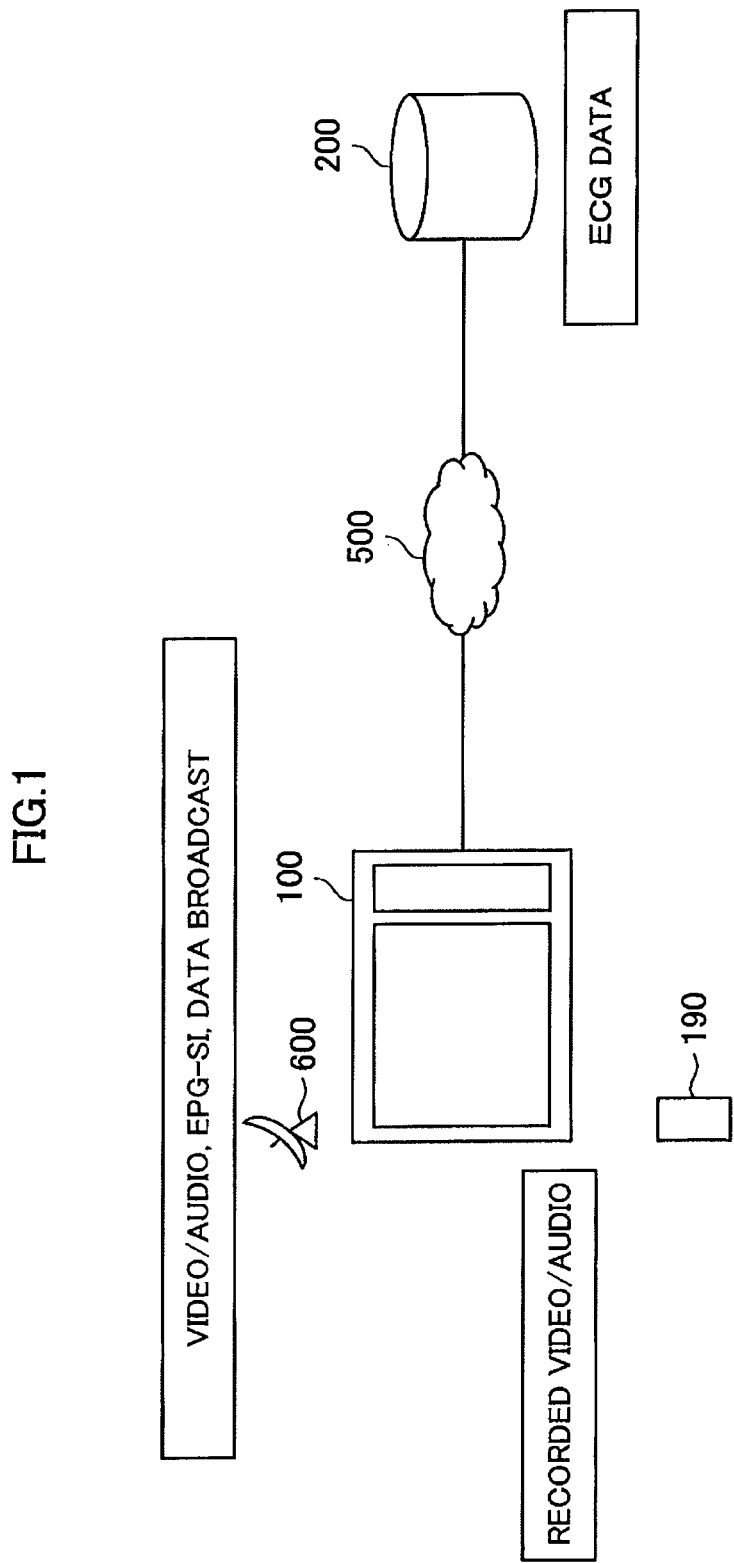
FIG. 1 is an explanatory view conceptually showing the overall configuration of an information providing system according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Overall Configuration of Information Providing System)

FIG. 1 is an explanatory view conceptually showing the overall configuration of an information providing system according to an embodiment of the present invention. Referring to FIG. 1, the information providing system includes a receiving terminal 100 (information receiving terminal) of a user and an electronic content guide (ECG) server 200 (information providing apparatus). The receiving terminal 100 receives information related to a program from the ECG server 200 which is connected thereto via a communication network 500. The ECG server 200 registers and manages information related to a program as ECG data and provides the registered and managed ECG data to the receiving terminal 100 via the communication network 500.

The receiving terminal 100 may have a function that receives video/audio information, data broadcast information, EPG-SI information and so on which are related to a program via a receiving antenna 600 or the like. The receiving terminal 100 may further have a function that plays back or records information received by the receiving terminal 100 itself or information received by an external device, or a function that plays back prerecorded information. The following description is on the assumption that the receiving terminal 100 has a function that receives such information by itself, plays back and records received information, and plays back prerecorded information, unless otherwise noted.

A user of the receiving terminal 100 selects information which is viewable or browsable (receivable), such as video/audio information, data broadcast information, EPG-SI information and ECG data that are related to a program, by operating a remote control 190 for the receiving terminal 100, for example. On a display screen of the receiving terminal 100, video information and ECG data which are related to a program may be respectively displayed on the left and right sides of the display screen, for example, in the state where ECG service provision is active.

Figure 2:
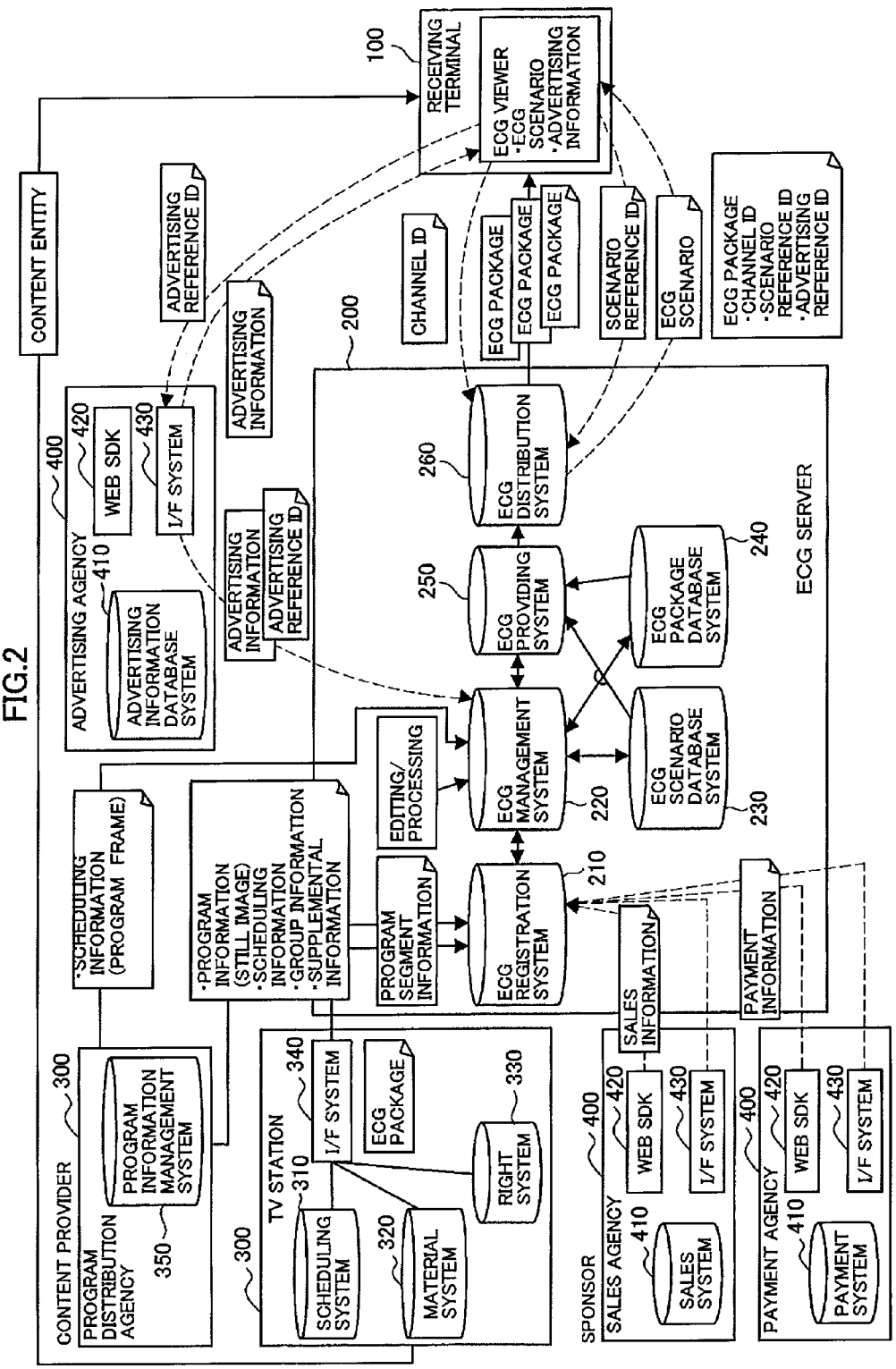
FIG. 2 is an explanatory view showing an example of the overall configuration model of an information providing system.

FIG. 2 is an explanatory view showing an example of the overall configuration model of an information providing system. Referring to FIG. 2, the information providing system includes the receiving terminal 100, the ECG server 200, a content provider 300 and a sponsor 400.

The content provider 300 is a program provider which includes a TV station, a data broadcast station, a program distribution agency and so on, for example. The content provider 300 provides video/audio information, data broadcast information and EPG-SI information related to a program to the receiving terminal 100 and further provides program information related to a program and detail information, which is described later, to the ECG server 200. The information related to a program includes program information (including still image information), scheduling information, group information, supplemental information, program segment information and so on (which are collectively referred to hereinafter as program information).

The TV station operates a scheduling system 310, a material system 320, a right system 330 and so on which manage program information related to a program. The data broadcast station operates a program information management system which manages program information related to a provided program that is provided by video-on-demand (VOD), near video-on-demand (NVOD), download, IP broadcasting services or the like. The program distribution agency operates a program information management system 350 which manages program information (scheduling information) related to a distributed program.

The sponsor 400 may include an advertising agency, a sales agency, a payment agency and so on which provide advertising, sales and payment services, for example. In some cases, it may also include a content provider which provides video/audio information related to a program. The sponsor 400 basically provides related information that is related to a program, which includes advertising information, sales information, payment information, program information and so on, to the receiving terminal 100 through the ECG server 200.

The sponsor 400 operates different kinds of information processing system 410 according to business type such as advertising, sales or payment system, a Web software development kit (SDK) 420, an I/F system 430 and so on. The sponsor 400 provides advertising information and sales information which introduce products or services that are sold or provided by an advertiser of the sponsor 400 or the sponsor 400 itself, for example. If the sponsor 400 is a payment agency, the sponsor 400 provides payment information in the processing of product purchase based on advertising information and sales information. If the sponsor 400 is a content provider, the sponsor 400 provides program information which introduces a program that is provided or distributed by the sponsor 400. The sponsor 400 which provides advertising information (advertising information managing device), particularly, operates an advertising information database system 410 which manages advertising information.

(Overall Configuration of Information Providing Apparatus)

The ECG server 200 is operated by an information service provider or the like which produces, manages and provides information related to a program as ECG data. The ECG serer 200 includes an ECG registration system 210, an ECG management system 220, an ECG scenario database system 230, an ECG package database system 240, an ECG providing system 250, an ECG distribution system 260 and so on.

The ECG registration system 210 registers information related to a program (program information, related information, an ECG package in some cases, etc.) which is provided from the content provider 300 and the sponsor 400. The ECG registration system 210 is connected to a character database, a dictionary database and so on, which are not shown, for example, and registers detail information concerning program information such as program scheduling, cast, genre, music and event related to a program.

The ECG management system 220 manages program information, related information, detail information, ECG package and so on which are registered in the ECG registration system 210. The ECG management system 220 performs various editing, processing and update of program information, related information and detail information. Particularly, the ECG management system 220 produces information related to a program as ECG data and establishes associations or set priorities among the ECG data, thereby editing them as an ECG scenario which contains a plurality of pieces of ECG data, as described in detail later. Further, the ECG management system 220 defines a collection of a plurality of ECG scenarios as an ECG package to be provided to the receiving terminal 100, as described in detail later.

Further, the ECG management system 220 produces program listing information which contains scheduling information of a plurality of programs as ECG data by performing editing and processing on program information. The information provided as the program listing information which is produced as ECG data is not limited, unlike electronic program guide (EPG) information of a related art, and the program listing information may contain information such as still images contained in program information, for example, in addition to information concerning a provision time and an overview of a program. Further, the program listing information is in conjunction with actual scheduling information, and it is updated in real time according to a change in program scheduling or the like.

The ECG scenario database system 230 stores an ECG scenario which is produced by the ECG management system 220 in association with a reference ID that can identify the ECG scenario. The ECG package database system 240 stores an ECG package which is produced by the ECG management system 220 in association with a discrimination ID that can identify an ECG channel which is allocated to the ECG package, as described in detail later.

The ECG providing system 250 provides ECG data including an ECG scenario and an ECG package to the receiving terminal 100 through the ECG distribution system 260 in cooperation with the ECG management system 220, the ECG scenario database system 230 and the ECG package database system 240. The ECG distribution system 260 distributes the ECG data which is provided form the ECG providing system 250 to the receiving terminal 100 in response to a request from the receiving terminal 100, as described in detail later.

In the ECG server 200, for example, the ECG management system 220 serves as an ECG package producing portion 282, an ECG channel managing portion 284, a related item extracting portion 286 and so on, which are described later. The ECG scenario database system 230 serves as an ECG scenario storage portion 270, and the ECG package database system 240 serves as an ECG package storage portion 272, which are respectively described later. The ECG providing system 250 serves as an ECG scenario providing portion 274, an ECG package providing portion 276 and so on, which are described later. The ECG distribution system 260 serves as an ID acquiring portion 278, a control portion 280 and so on, which are described later. Such a configuration, however, is illustrated by an example only, and the configuration of the ECG server 200 is not limited to the above-described configuration.

(Configuration of Receiving Terminal)

Figure 3:
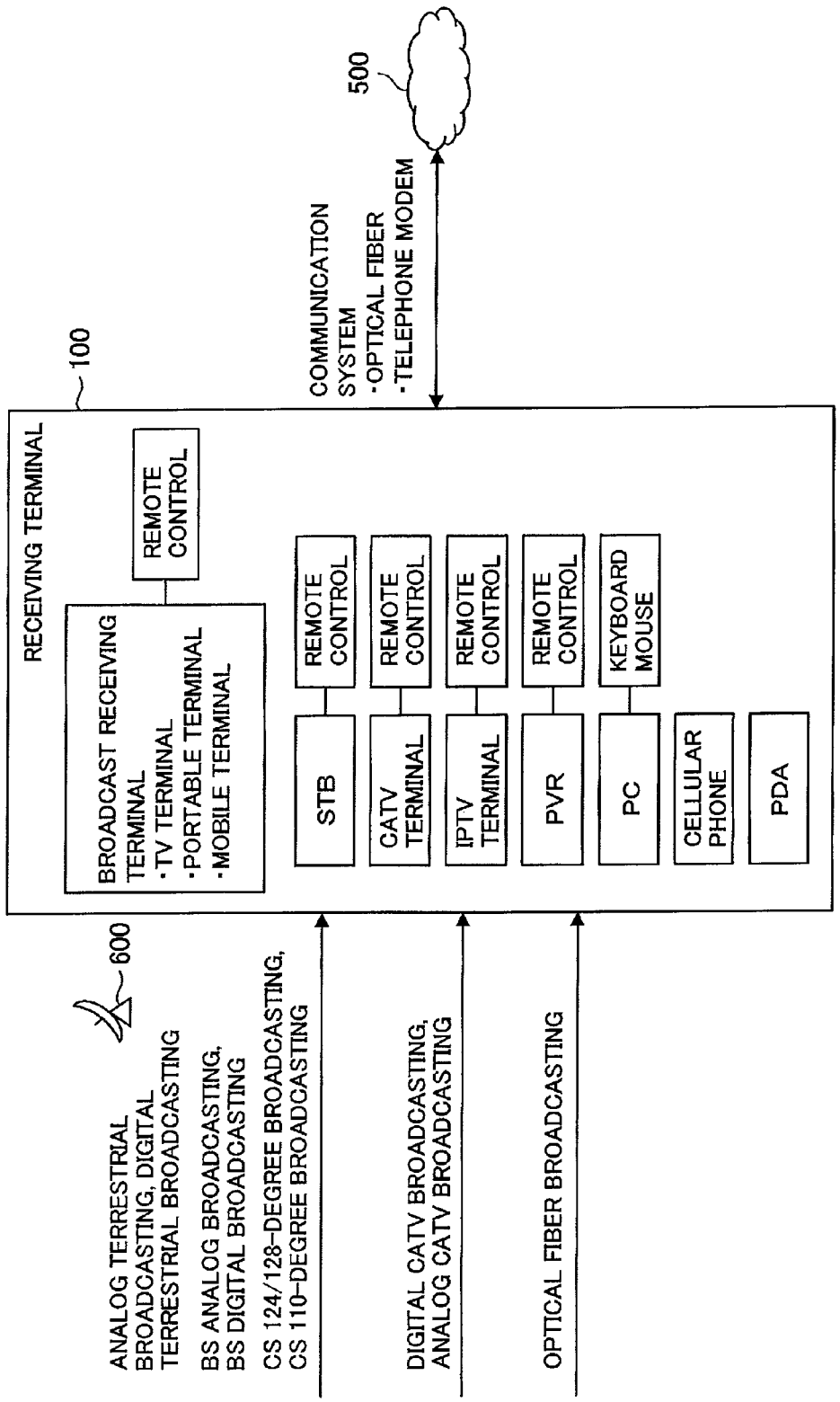
FIG. 3 is an explanatory view conceptually showing an example of the configuration of a receiving terminal which is included in an information providing system.

FIG. 3 is an explanatory view conceptually showing the exemplary configuration of a receiving terminal which is included in an information providing system. Referring to FIG. 3, the receiving terminal 100 may be a broadcast receiving terminal such as a TV terminal, a portable terminal or a mobile terminal, a set top box (STB), a CATV terminal, an internet protocol television (IPTV) terminal, a personal video recorder (PVR), a personal computer (PC), a cellular phone or a personal digital assistant (PDA), for example.

The receiving terminal 100 includes the one that does not have a function of receiving information via the receiving antenna 600 or the like, a function of playing back or recording received information, a function of playing back recorded information and so on. The following description is on the assumption that the receiving terminal 100 has a function that receives such information by itself, plays back and records received information, and plays back recorded information, unless otherwise noted.

The receiving terminal 100 communicates with an external system and an external device via the communication network 500 which includes an optical fiber, asymmetric digital subscriber line (ADSL), a telephone modem or the like, for example. The receiving terminal 100 receives programs which are provided through various transmission lines, such as analog terrestrial broadcasting, digital terrestrial broadcasting, broadcast satellite (BS) analog broadcasting, BS digital broadcasting, communication satellite (CS) 124/128-degree broadcasting, CS 110-degree broadcasting, digital common antenna television (CATV) broadcasting, analog CATV broadcasting and optical fiber broadcasting, for example, via the receiving antenna 600 or the like.

The receiving terminal 100 may be operated using a remote control, a keyboard, a mouse and so on. A remote control 190 for the receiving terminal 100 may include a channel selection button for selecting the channel of a program to be received, a recording/playback button, an up/down/left/right button, an enter button, a return button and so on, for example. A user of the receiving terminal 100 can directly select the channel of or directly records a program which is currently viewable by operating the channel selection button or the recording button. Alternatively, a user can select the channel of a program or record or reserve recording of a program by selecting a desired program through the operation of the up/down/left/right button or the like based on program listing information. The up/down/left/right button, the enter button and the return button may be operated in the same manner for selection and determination of various information, besides channel selection and recording/playback of a program.

The remote control 190 may further include an EPG-SI information button, a data broadcast information button, an ECG service button and so on, for example. A user can obtain EPG-SI information and data broadcast information from the content provider 300 by operating the EPG-SI information button and the data broadcast information button, respectively. A user can also obtain an ECG service provided from the ECG server 200 by operating the ECG service button.

Although the operation method using the remote control is described above, the operation method using a keyboard, a mouse or an operating portion in the main body of the receiving terminal 100 is substantially the same as the operation method using the remote control 190, and a detailed description is omitted.

Figure 4:
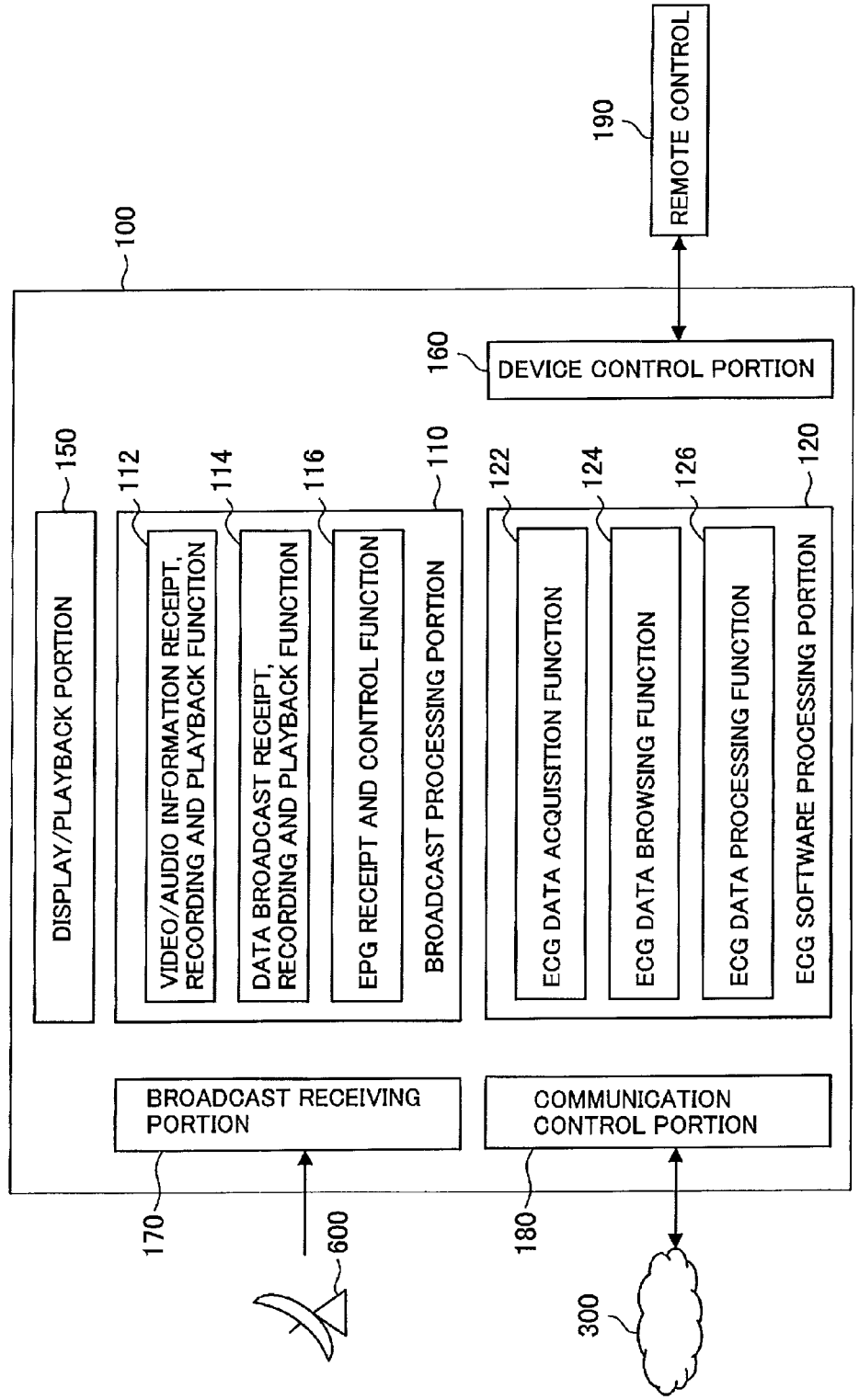
FIG. 4 is an explanatory view conceptually showing the functional configuration of a receiving terminal.

FIG. 4 is an explanatory view conceptually showing the functional configuration of a receiving terminal. Each functional block of the receiving terminal 100 is controlled by a computer system which includes CPU or the like. A storage portion which is included in the receiving terminal 100 and/or a storage (recording) medium which is removable from the receiving terminal 100 stores a program for causing each functional block to be functioning and so on.

Referring to FIG. 4, the receiving terminal 100 includes a broadcast processing portion 110, an ECG software processing portion 120, a display/playback portion 150 and a device control portion 160. The broadcast processing portion 110 includes a video/audio information receipt, recording and playback function 112, a data broadcast receipt, recording and playback function 114 and an EPG receipt and control function 116. The ECG software processing portion 120 includes an ECG data acquisition function 122, an ECG data browsing function 124 and an ECG data processing function 126.

In the receiving terminal 100, with the function of the ECG data acquisition function 122, the ECG software processing portion 120 serves, in conjunction with the communication control portion 180, as an ECG package acquiring portion 130, an ECG package list acquiring portion 131, an ECG scenario acquiring portion 132, an advertising information acquiring portion 134, an ID designating portion 138 and so on, which are described later. With the functions of the ECG data browsing function 124 and the ECG data processing function 126 which process ECG data that is acquired from the ECG server 200, the ECG software processing portion 120 serves as a control portion 140 which includes a display/playback control portion 142, an ECG channel selecting portion 144, an ECG channel sorting portion 145, an ECG package list processing portion 146, an ECG package processing portion 147, an ECG scenario processing portion 148 and an advertising information processing portion 149, which are described later. Further, the ECG software processing portion 120 includes a storage portion, though not shown, which serves as a preference information storage portion 136, which is described later. The display/playback portion 150 serves, in conjunction with the ECG software processing portion 120, the device control portion 160 and so on, as a display/playback portion 139 or the like, which is described later. A broadcast receiving portion 170 serves as a video receiving portion 137 or the like, which is described later. Further, the remote control 190 serves as an operation input portion 135 or the like, which is described later. Such a configuration, however, is illustrated by an example only, and the configuration of the receiving terminal 100 is not limited to the above-described configuration.

(Elements of Receiving Terminal, ECG Server and Advertising Sponsor)

Figure 5:
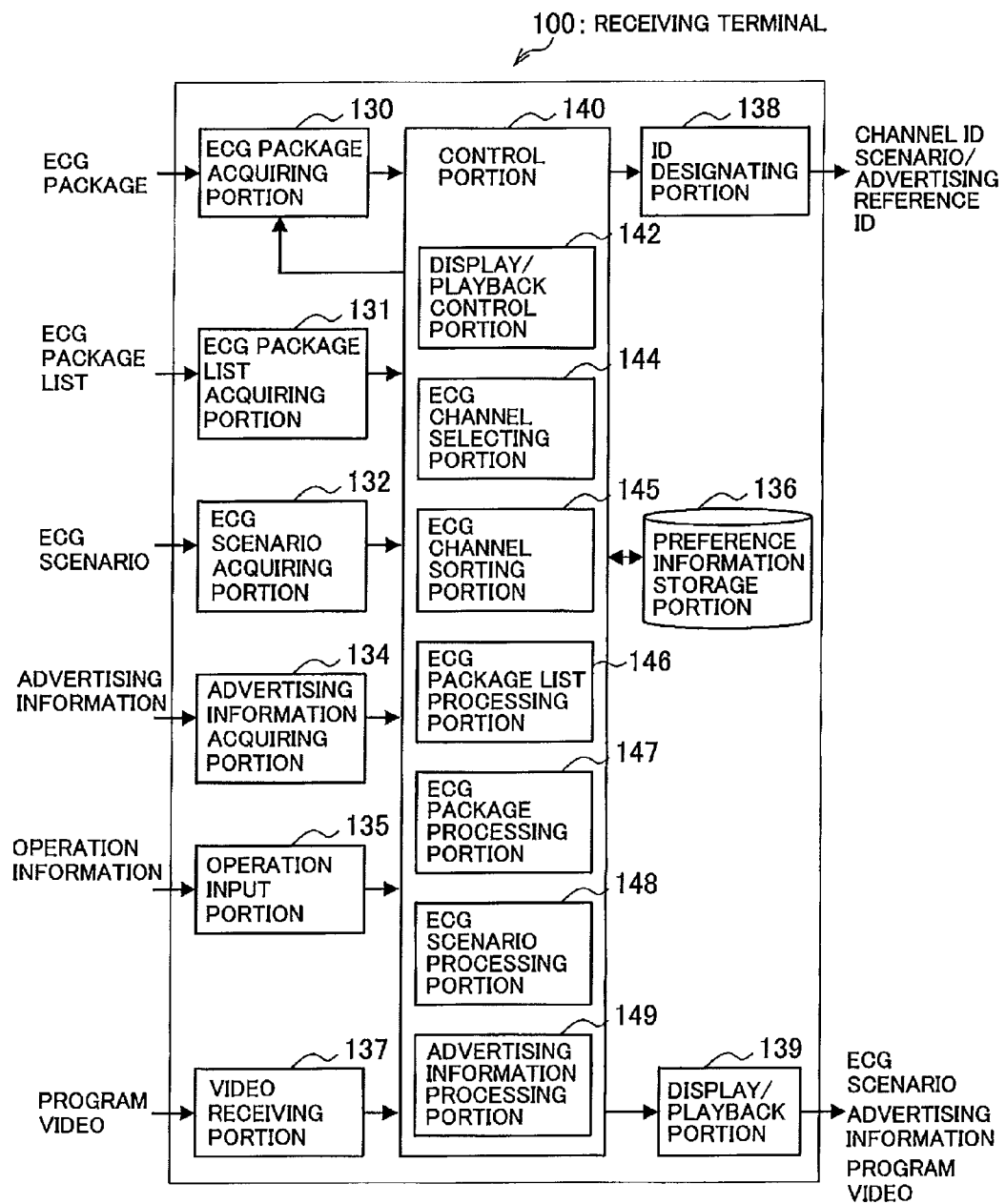
FIG. 5 is a block diagram showing a main element (a receiving terminal) of an information providing system according to an embodiment of the present invention.
Figure 6:
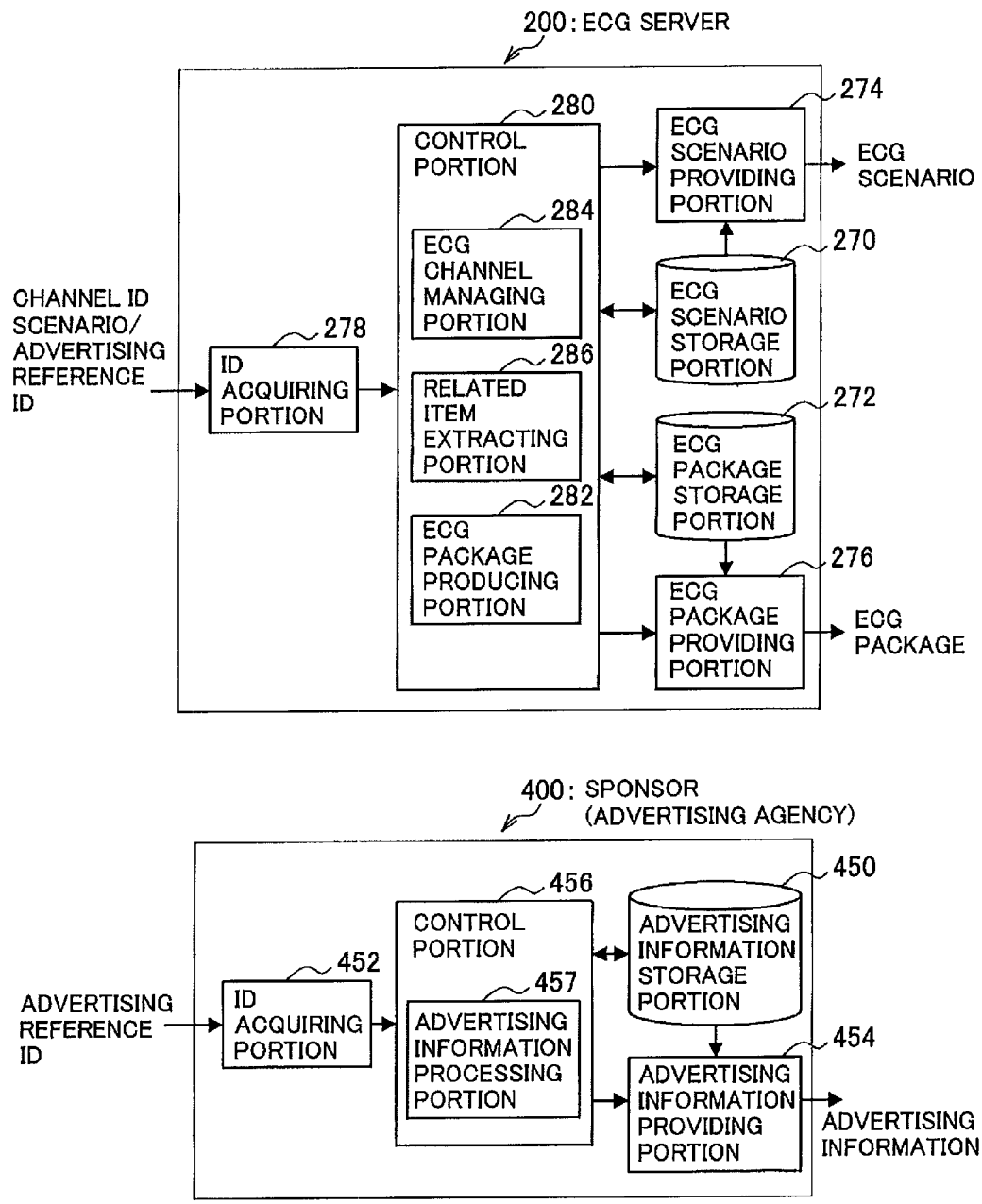
FIG. 6 is a block diagram showing main elements (an ECG server and a sponsor) of an information providing system according to an embodiment of the present invention.

FIGS. 5 and 6 are block diagrams showing the main elements of the information providing system according to this embodiment.

Referring to FIG. 5, the receiving terminal 100 includes the ECG package acquiring portion 130, the ECG package list acquiring portion 131, the ECG scenario acquiring portion 132, the advertising information acquiring portion 134, the operation input portion 135, the preference information storage portion 136, the video receiving portion 137, the ID designating portion 138, the display/playback portion 139, and the control portion 140.

The ECG package acquiring portion 130 acquires an ECG package which is provided through a particular ECG channel from the ECG server 200 based on a discrimination ID of an ECG channel. The ECG package list acquiring portion 131 acquires an ECG package list which is managed by the ECG server 200. The ECG scenario acquiring portion 132 acquires a particular ECG scenario from the ECG server 200 based on a reference ID of scenario information which is contained in an acquired ECG package. The advertising information acquiring portion 134 acquires particular advertising information from the sponsor (advertising agency) 400 based on a reference ID of advertising information which is contained in an acquired ECG package. The operation input portion 135 receives operation information by a user, such as selection of an ECG channel and processing regarding an ECG scenario.

The video receiving portion 137 receives video information (including audio information) concerning a program from the content provider 300.

The preference information storage portion 136 stores preference information of a user. The ID designating portion is a functional component that designates a discrimination ID of an ECG channel and a reference ID of an ECG scenario to the ECG server 200 and designates a reference ID of advertising information to the sponsor 400. The display/playback portion displays and plays back an ECG scenario, an ECG channel, advertising information, a program video and so on.

The control portion 140 controls the function of components of the receiving terminal 100 as a whole, and it includes the display/playback control portion 142, the ECG channel selecting portion 144, the ECG channel sorting portion 145, the ECG package list processing portion 146, the ECG package processing portion 147, the ECG scenario processing portion 148 and the advertising information processing portion 149. The display/playback control portion 142 controls display and playback of acquired information. The ECG channel selecting portion 144 selects a particular ECG channel from a plurality of ECG channels. The ECG channel sorting portion 145 sorts out an ECG channel which provides an ECG package that matches preference information based on an ECG scenario that is included in an ECG package. The ECG package list processing portion 146, the ECG package processing portion 147, the ECG scenario processing portion 148 and the advertising information processing portion 149 perform processing concerning an ECG package list, an ECG package, an ECG scenario and advertising information, respectively.

Referring to FIG. 6, the ECG server 200 includes the ECG scenario storage portion 270, the ECG package storage portion 272, the ECG scenario providing portion 274, the ECG package providing portion 276, the ID acquiring portion 278 and the control portion 280.

The ID acquiring portion 278 acquires a discrimination ID of an ECG channel and a reference ID of an ECG scenario from the receiving terminal 100, and acquires a reference ID of advertising information from the advertising sponsor 400.

The ECG scenario storage portion 270 stores an ECG scenario related to a program in association with a reference ID. The ECG package storage portion 272 stores reference IDs of a plurality of ECG scenarios related to a plurality of programs in association with a discrimination ID of an ECG channel which is allocated to an ECG package in order to provide a collection of information related to a plurality of programs having a relationship with each other as an ECG package. The ECG scenario providing portion 274 acquires a reference ID of a particular ECG scenario which is included in an ECG package from the receiving terminal 100, extracts the ECG scenario which corresponds to the acquired reference ID from the ECG scenario storage portion 270 and provides the extracted ECG scenario to the receiving terminal 100. The ECG package providing portion 276 acquires a discrimination ID of a particular ECG channel from the receiving terminal 100, extracts the ECG package which corresponds to the acquired discrimination ID from the ECG package storage portion 272 and provides the extracted ECG package to the receiving terminal 100.

The control portion 280 controls the function of components of the ECG server 200 as a whole, and it includes the ECG package producing portion 282, the ECG channel managing portion 284 and the related item extracting portion 286. The ECG package producing portion 282 produces an ECG package in order to provide a collection of information related to a plurality of programs having a relationship with each other as an ECG package. The ECG channel managing portion 284 manages an ECG channel which is allocated to an ECG package. The related item extracting portion 286 extracts a common related item from a plurality of ECG scenarios related to a plurality of programs.

Referring also to FIG. 6, the sponsor (advertising agency) 400 includes an advertising information storage portion 450, an ID acquiring portion 452, an advertising information providing portion 454, and a control portion 456 that includes an advertising information processing portion 457. The advertising information storage portion 450 is included in the advertising information database system 410, which is described earlier. The ID acquiring portion 452, the advertising information providing portion 454 and the control portion 456 including the advertising information processing portion 457 are included in the Web SDK 420 and the I/F system 430, which are also described earlier.

The advertising information storage portion 450 stores advertising information in association with a reference ID. The ID acquiring portion 452 acquires a reference ID of particular advertising information from the receiving terminal 100. The advertising information providing portion 454 provides advertising information to the receiving terminal 100 and the ECG server 200. The control portion 456 includes the advertising information processing portion 457 which performs registration, management or the like of advertising information.

(Structure of ECG Scenario)

Figure 7:
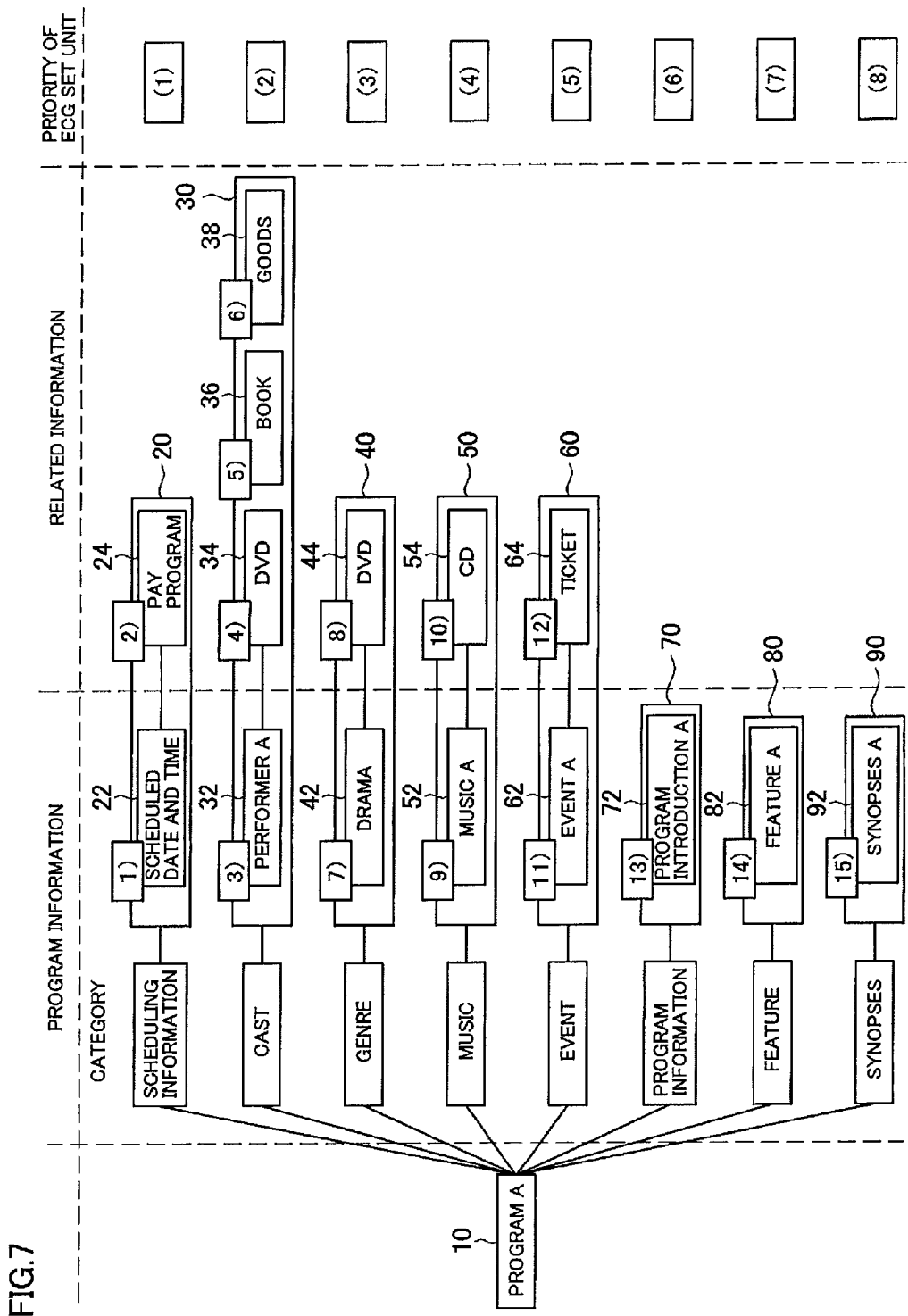
FIG. 7 is an explanatory view showing an example of the structure of ECG data which is contained in an ECG scenario.

FIG. 7 is an explanatory view showing the exemplary structure of ECG data which are contained in an ECG scenario. Referring to FIG. 7, an ECG scenario contains program information, related information, and association information which establishes association among a program, program information and related information. An ECG scenario is a collection of ECG sets, each set being composed of at least either one of program information and related information.

In the ECG scenario which is illustrated in FIG. 7, the program information which are associated with the program A10 include "scheduled date and time" 22, "performer A" 32, "drama" 42, "music A" 52, "event A" 62, "program introduction A" 72, "feature A" 82 and "synopses A" 92. The program information are classified into categories of scheduling information, cast, genre, music, event, program introduction, feature and synopses, respectively. Further, the related information is associated with each program information. For example, the related information "DVD" 34, "book" 36 and "goods" 38 are associated with the program information "performer A" 32, so that one ECG set 30 is formed. Further, an ECG scenario which is a collection of all or part of the ECG sets 20 to 90 that respectively correspond to the program information is formed.

Priorities may be set to ECG sets which constitute an ECG scenario and to program information and/or related information as described in the followings. Priorities "(1)" to "(8)" are respectively set to the ECG sets 20 to 90. Further, priorities are also set to the program information and the related information according to the priorities of the ECG sets. For example, priorities "3)" to "6)" are respectively set to the program information 32 and the related information 34, 36 and 38 which are associated with the program information 32. Accordingly, in the execution of the ECG scenario, after the program information 32 is displayed, the related information 34, 36 and 38 which are associated with the program information 32 are sequentially displayed, and then the program information 42 with the priority "7)" is displayed after that.

The ECG scenario contains program information and/or related information and is associated with detail information concerning program information and/or detail information concerning related information. The detail information concerning program information includes detail information about program scheduling and cast, detail information about music and event related to a program and so on, for example. The detail information concerning related information includes, if it is the related information about advertising information, detail information of advertisement, for example. If it is the related information about sales, the detail information concerning related information includes information about purchase and payment procedure, for example. If it is the related information about program information, the detail information concerning the related information includes information about recording or viewing reservation of a program, for example.

The detail information concerning program information is provided from the ECG server 200 to the receiving terminal 100 when an operation request is made by a user while the relevant program information is displayed. The detail information concerning related information is provided from the sponsor 400 to the receiving terminal 100 through the ECG server 200 when an operation request is made by a user while the relevant related information is displayed. The detail information concerning related information may include information about processing such as purchase and payment procedure, questionnaire and recording or viewing reservation, for example, and prescribed processing is performed between a user and the sponsor 400 through the receiving terminal 100 based on the information.

(Metadata of ECG Scenario)

FIGS. 8A and 8B and 9A to 9C are explanatory views showing examples of metadata which constitute an ECG scenario. FIGS. 8A and 8B and 9A to 9C illustrate metadata of program and related information, an ECG scenario and ECG sets, respectively.

The metadata of a program shown in FIG. 8A contains description of information for associating a program with an ECG scenario related to a program. The metadata contains description of information such as a program genre, a keyword, a cast and so on. In the metadata, "P00001", "professional style", "documentary", "AAAAAA BBBBBB knowhow impression" and "sc00001" are described as a program ID, a program name, a genre, a keyword, and a reference ID of an ECG scenario (relation ref), respectively. Further, "2007/7/10 22:00:00" and "Jul. 10, 2007 23:00:00" are described as the provision start date and time and the provision end date and time of the program, respectively. Furthermore, the casts who appear on the program are described, and it is described for the cast with the person ID "1_1" that a name is "AAAAAA" and a birthplace is "Japan", for example.

The metadata of related information shown in FIG. 8B contains descriptions of information such as a related information genre, a keyword, a place to obtain detail information and so on. In the metadata, "C00001", "product 1", "publication", "XXX YYY ZZZ", "zony", "100 yen" and "www.zony.co.jp" are described as a related information ID (content id), a related information name, a genre, a keyword, a maker, a price, and a place to obtain detail information, respectively.

The metadata of an ECG scenario shown in FIG. 9A contains descriptions of information of ECG sets which constitute an ECG scenario that is referred to by the metadata related to a program shown in FIG. 8A. In the metadata, "sc00011", "ECG scenario", "2007/7/1 00:00:00" and "2007/7/20 00:00:00" are described as an ECG scenario ID, an ECG scenario name, and the provision start date and time and the provision end date and time (or valid period) of the ECG scenario, respectively. In addition, it is described that the provision date and time of a program to which the ECG scenario is associated is from 22:00 to 23:00 on 2007/7/10. Further, an ECG set 1 and an ECG set 2 which constitute the ECG scenario are designated, and it is described that an ECG set content ID and an ECG set ID of each ECG set are "ecg_set_c1" and "es00001" and "ecg_set_c2" and "es00002", respectively.

The metadata of an ECG set shown in FIG. 9B contains descriptions of program information and related information which constitute the ECG set 1 described above and so on. In the metadata, "es00001", "ECG set 1", "2007/7/1 00:00:00" and "2007/7/20 00:00:00" are described as an ECG set ID, an ECG set name, and the provision start date and time and the provision end date and time (or valid period) of the ECG set, respectively. Further, four pieces of ECG data with the item ID (content ID) "c11", "c12", "c13" and "c14" which constitute the ECG set 1 are described. For example, it is described for the ECG data with the item ID "c11" that a data type, a program information ID (program ID), provision start date and time and provision end date and time are "program (program information)", "Poll", "2007/7/1 00:00:00" and "2007/7/10 22:00:00", respectively. On the other hand, it is described for the ECG data with the item ID "c14" that a data type, a related information ID (content ID), provision start date and time and provision end date and time are "product (product information)", "C011", "2007/7/1 00:00:00" and "2007/7/20 00:00:00", respectively.

The provision start date and time and the provision end date and time of the ECG data with the item ID "c11", "c12" and "c13", which correspond to program information, are set to the period before the program provision date and time (22:00 to 23:00 on 2007/7/10), the period of the program provision date and time, and the period after the program provision date and time, respectively. On the other hand, the provision start date and time and the provision end date and time of the ECG data with the item ID "c14", which corresponds to related information, is set to the period before to after the program provision date and time including the program provision date and time. Thus, when the ECG scenario which contains the ECG set 1 is executed, the ECG data with the item ID "c11", "c12" and "c13" are displayed as program information sequentially in the period before the program provision date and time, the period of the program provision date and time, and the period after the program provision date and time. On the other hand, the ECG data with the item ID "c14" is displayed as related information in the period before to after the program provision date and time including the program provision date and time.

The metadata of an ECG set shown in FIG. 9C contains descriptions of information such as program information and related information which constitute the ECG set 2 described above. In the metadata, three pieces of ECG data with the item ID "c21", "c22" and "c23", which constitute the ECG set 2, are described. Detailed description of the ECG data is omitted because it is substantially the same as the metadata of the ECG set 1 shown in FIG. 9B.

(Production and Provision of ECG Scenario)

Figure 10:
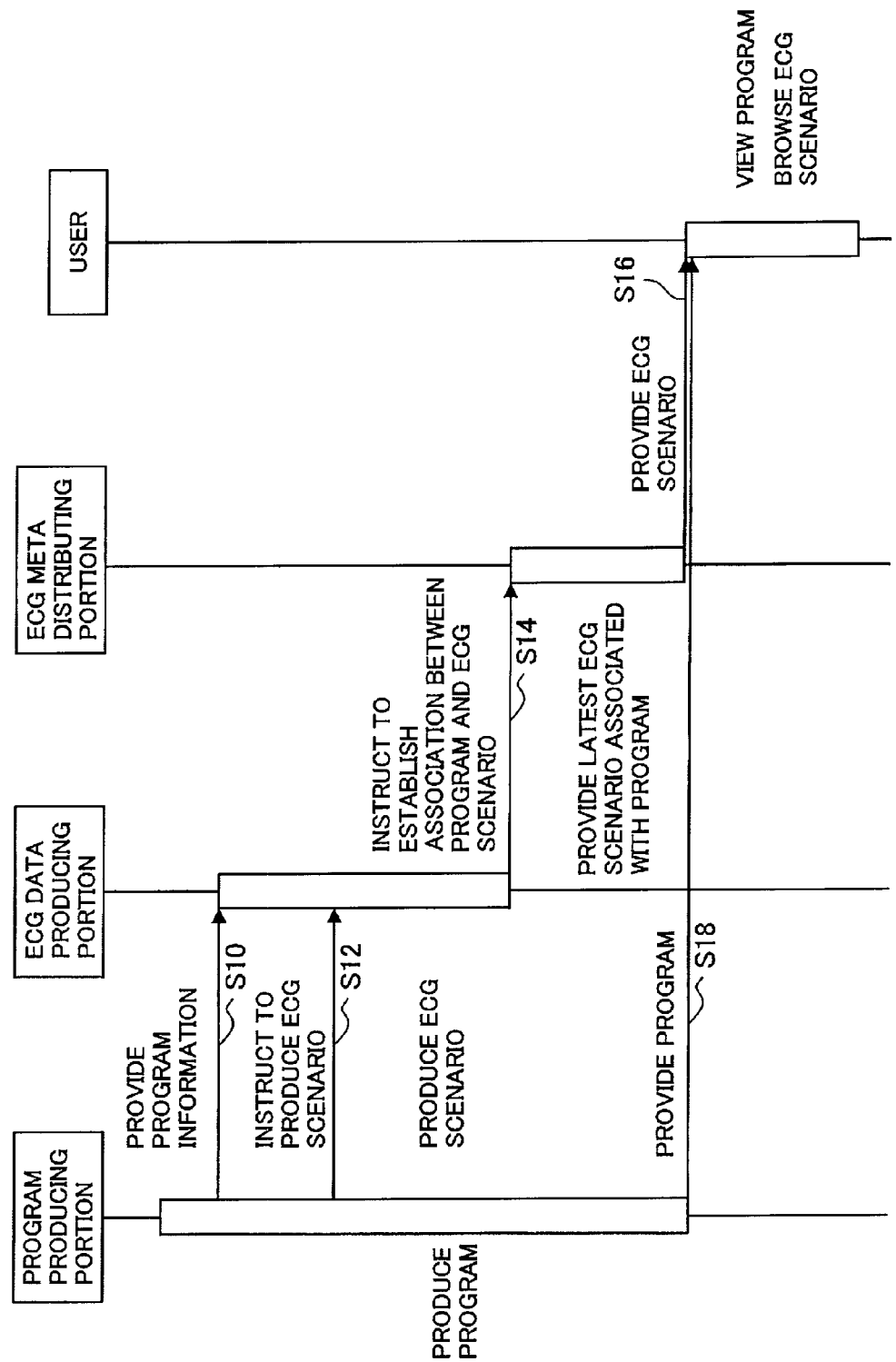
FIG. 10 is a sequence chart showing a flow from production to provision of an ECG scenario.

FIG. 10 is a sequence chart showing the flow from the production to the provision of an ECG scenario.

Referring to FIG. 10, a program producing portion such as the content provider 300 produces a program, provides program information of the program (Step S10), and instructs an ECG data producing portion to produce an ECG scenario (S12). The ECG data producing portion, which is a part of the ECG server 200, produces an ECG scenario based on the instruction from the program producing portion and then instructs an ECG meta distributing portion to associate the ECG scenario with the program (S14). The ECG meta distributing portion, which is also a part of the ECG server 200, provides the latest ECG scenario in association with the program. Then, the ECG meta distributing portion provides metadata that forms the ECG scenario which is associated with the program as shown in FIGS. 8A, 8B and 9A to 9C, for example (S16), in addition to providing the program from the program producing portion (content provider 300) (S18), to a user.

(Process Flow of ECG Scenario)

Figure 11:
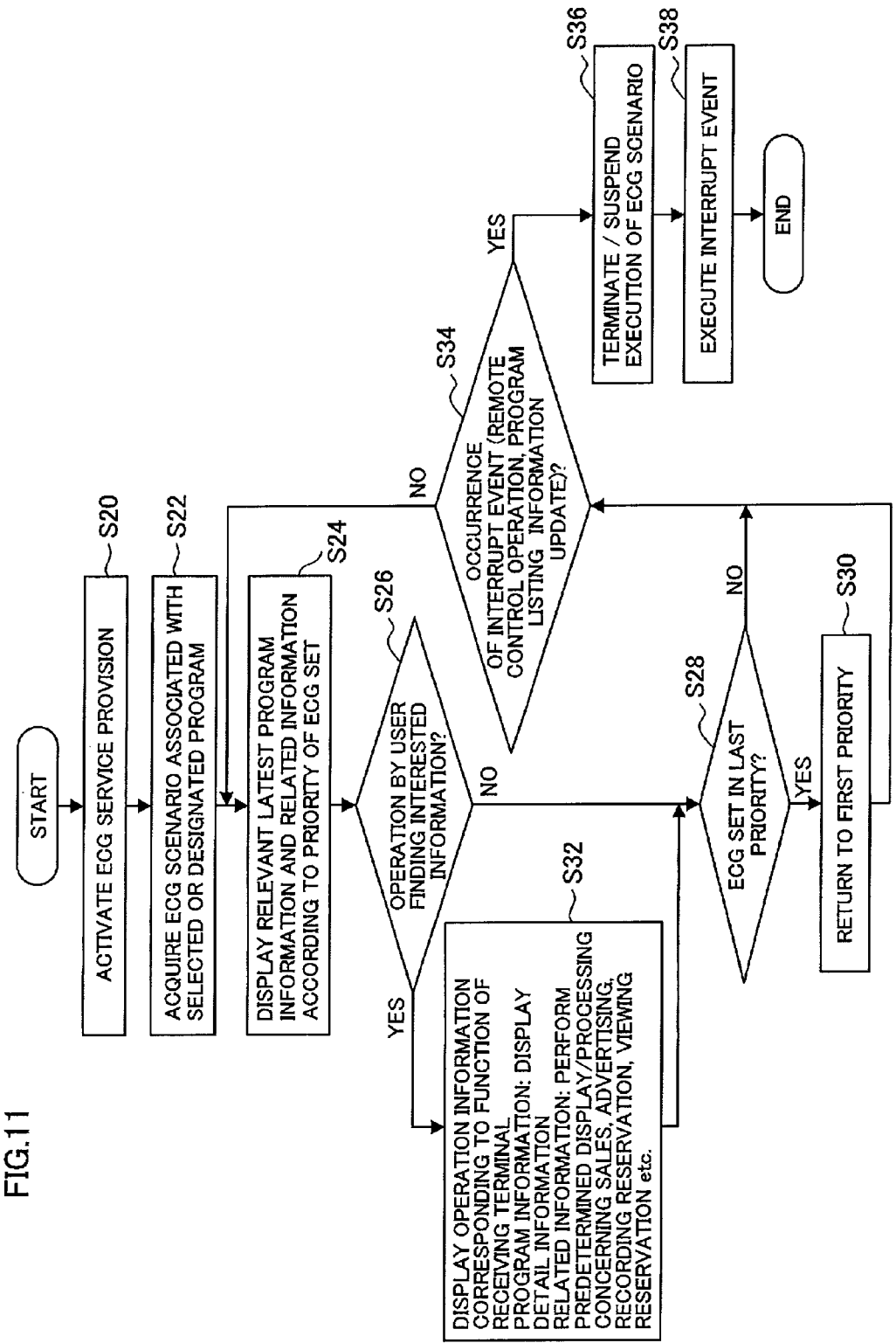
FIG. 11 is a flowchart showing a process flow in the execution of an ECG scenario.

FIG. 11 is a flowchart showing a process flow in the execution of an ECG scenario.

Prior to the execution of an ECG scenario, the provision of an ECG service is activated through the operation of the receiving terminal 100 by a user (Step S20). After the provision of an ECG service is activated, the latest ECG scenario which is associated with a selected/designated program is acquired from the ECG server 200 (S22). After the ECG scenario is acquired, an acquired ECG scenario is executed according to the metadata shown in FIGS. 8A, 8B and 9A to 9C, for example.

When the ECG scenario is executed, program information and related information which constitute the ECG scenario are sequentially displayed in units of ECG sets according to the priorities that are set thereto (S24). After the display of all the ECG sets which constitute the ECG scenario is completed (S28), the display of the ECG scenario is repeated according to the priorities (S30).

If a user finds interested information in the displayed program information and related information, the user performs determination operation (S26). When the determination operation is performed, the processing for the display of the detail information concerning the program information and the related information or the provision of services concerning the related information is performed according to the program information and the related information which are displayed at the time when the determination operation is performed (S32). In the processing of the program information and the related information (S32), appropriate operation information may be generated and displayed according to function information which specifies the function of the receiving terminal 100, such as including reservation processing of program viewing when the receiving terminal 100 has a video playback function or including reservation processing of program recording when it has a video recording program, for example.

During the execution of an ECG scenario, if an interrupt event such as remote control operation not related to the execution of the ECG scenario or update/change of program listing information occurs (S34), the execution of the ECG scenario is terminated or suspended (S36), and the interrupt event is executed (S38).

(Overview of ECG Package)

Figure 12:
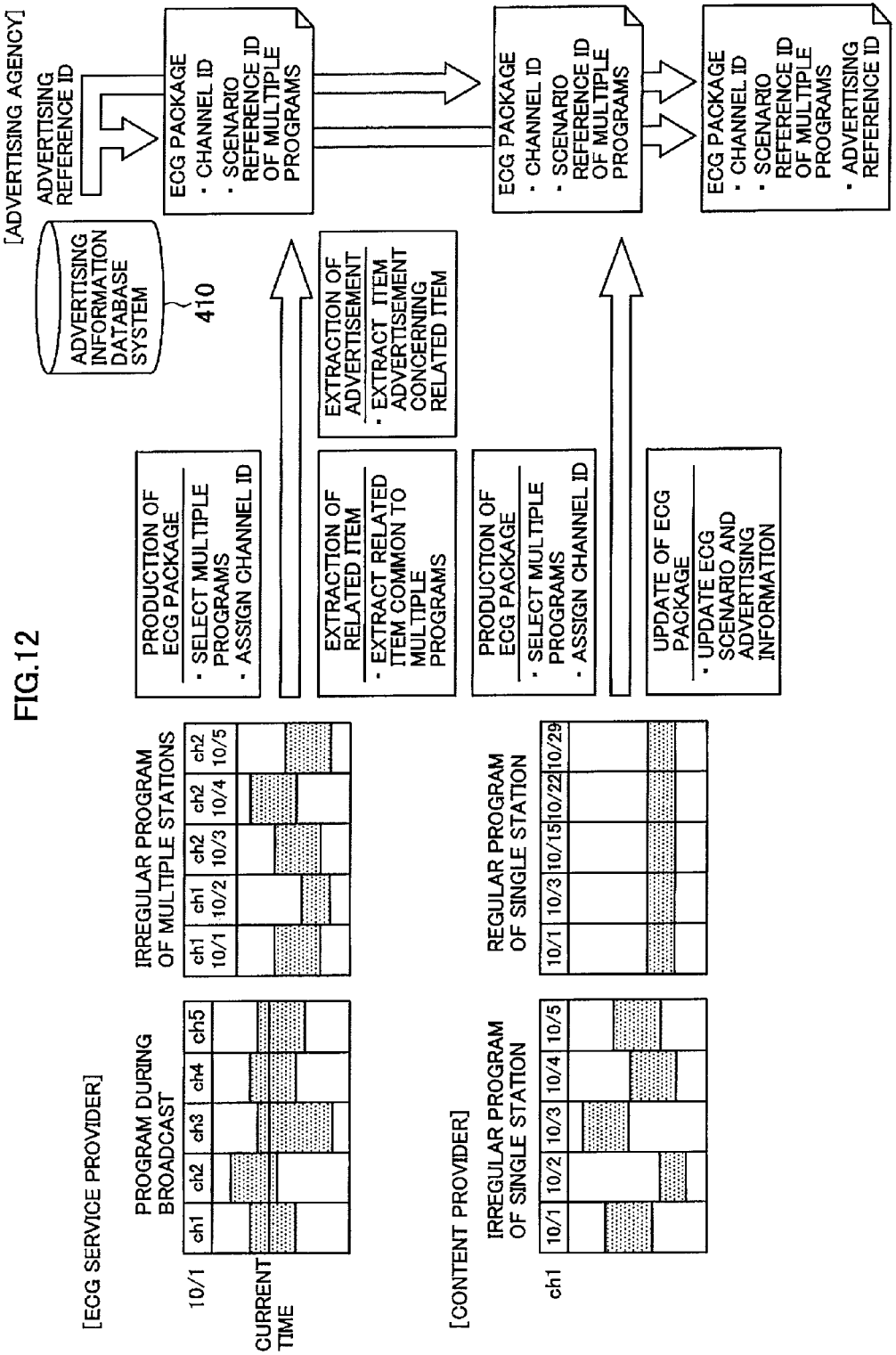
FIG. 12 is an explanatory view showing the overview of an ECG package which is specific to an embodiment of the present invention.

FIG. 12 is an explanatory view showing the overview of an ECG package which is specific to an embodiment of the present invention. An ECG package is produced so as to provide a collection of information related to a plurality of programs having a relationship with each other all together. The programs having a relationship with each other refer to programs which have some relationship with each other objectively or subjectively, such as a current time, provision date and time of a program and a keyword related to a program, for example.

FIG. 12 shows programs which are currently provided, programs which are irregularly provided by a plurality of content providers 300 (e.g. broadcast stations), programs which are irregularly provided by a single content provider 300, and programs which are regularly provided by a single content provider 300, as examples of a plurality of programs having a relationship with each other.

The ECG server 200 stores an ECG scenario related to a program in association with a reference ID in the ECG scenario database system 230, and the advertising sponsor 400 stores advertising information to be associated with an ECG package in association with a reference ID in the advertising information database system 410.

When defining an ECG package, a plurality of ECG scenarios related to a plurality of programs having a relationship with each other are associated with an ECG channel to be allocated to an ECG package. Specifically, an ECG package which contains reference IDs of a plurality of ECG scenarios related to a plurality of programs and a discrimination ID of an ECG channel is produced by the ECG server 200 or the content provider 300, and stored into the ECG package database system 240 by the ECG server 200. As for a plurality of programs which are provided from the same source, an ECG package is produced by the ECG server 200 and/or the content provider 300 and, as for a plurality of programs which are provided from different sources, an ECG package is produced by the ECG server 200.

After the ECG scenarios are associated with the ECG channel, advertising information to be associated with the ECG package is associated with the ECG channel. Specifically, a common related item such as a keyword related to a plurality of programs is extracted from the ECG scenarios by the ECG server 200, and advertising information which is appropriate for the related item is extracted from the advertising information database system 410. From the extracted advertising information, advertising information to be associated with the ECG channel is sorted out by the ECG server 200. Further, a reference ID of the advertising information to be associated with the ECG package and a discrimination ID of the ECG channel are associated by the ECG server 200 and stored into the ECG package database system 240, as an ECG package.

In an ECG package, ECG scenarios and advertising information which are provided as an ECG package are defined using reference IDs of the ECG scenarios and the advertising information. Thus, if the ECG scenario or the advertising information is updated, the latest ECG scenario and advertising information are provided to the receiving terminal 100 based on the reference IDs.

(Structure of ECG Package)

Figure 13:
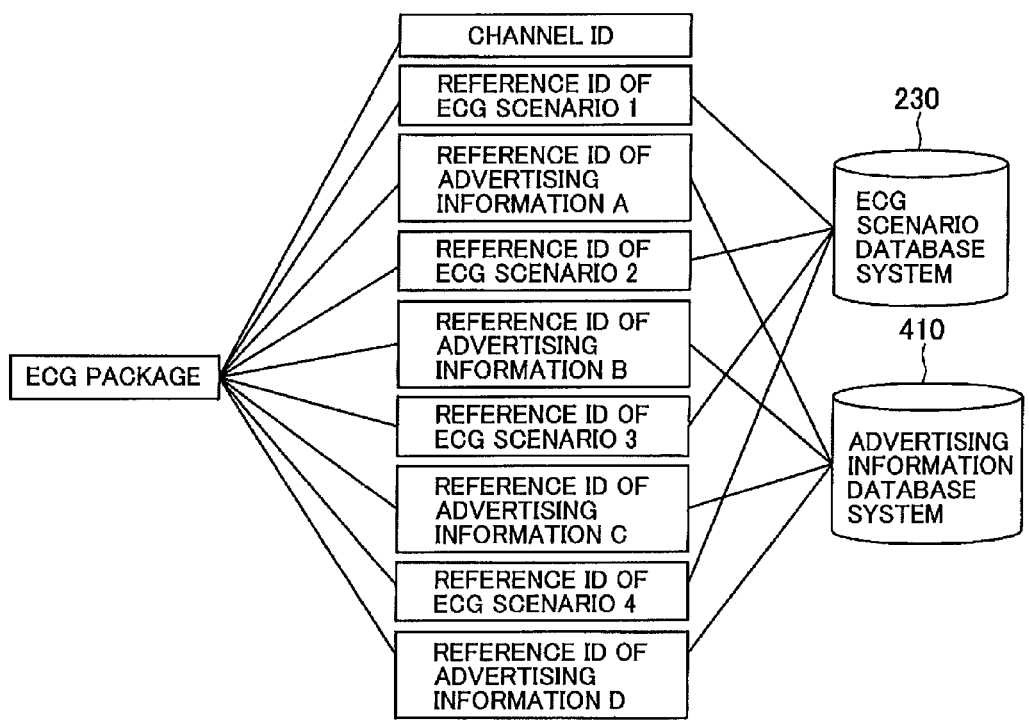
FIG. 13 is an explanatory view showing the structure of an ECG package.

FIG. 13 is an explanatory view showing the configuration of an ECG package. Referring to FIG. 13, an ECG package is composed of a discrimination ID of an ECG channel which is allocated to provide an ECG package, reference IDs of ECG scenarios 1 to 4 related to a plurality of programs, and reference IDs of advertising information A to D which are associated with the ECG package.

The receiving terminal 100 acquires an ECG package which is provided by the ECG server 200 and acquires an ECG scenario which corresponds to a reference ID of the ECG scenario that is contained in the ECG package from the ECG scenario database system 230. Further, the receiving terminal 100 acquires advertising information which corresponds to a reference ID of advertising information from the advertising information database system 410. Although an ECG package contains one or more ECG scenarios, and one or more advertising information are associated therewith according to need, the number of them is not limited thereto.

Thus, an ECG package may contain two ECG scenarios, and one advertising information may be associated with the ECG package, for example.

(Metadata of ECG Package)

FIGS. 14A to 14C and FIGS. 15A and 15B are explanatory views showing examples of metadata which constitute an ECG package. FIGS. 14A to 14C and FIGS. 15A and 15B illustrate metadata of an ECG package and ECG scenarios, and advertising information and an ECG set, respectively.

The metadata of an ECG package shown in FIG. 14A contains description of information for associating an ECG channel to be allocated to an ECG package with ECG scenarios related to a plurality of programs and advertising information. In the metadata, "package 01", "ECG package 1" and "world athletics" are described as an ECG package ID, a name, and an ECG channel name, respectively. Further, "2007/7/1 00:00:00" and "Jul. 20, 2007 00:00:00" are described as the provision start date and time and the provision end date and time of an ECG package. Furthermore, in order to designate two ECG scenarios which constitute the ECG package, content IDs of the ECG scenarios and ECG scenarios IDs "ecg_scenario_c1" and "sc00001" and "ecg_scenario_c2" and "sc00002" are described. In addition, in order to designate two pieces of advertising information which are associated with the ECG package, content IDs of the advertising information and reference IDs of the advertising information "ecg_ad_content_c1" and "ad00111" and "ecg_ad_content_c2" and "ad00112" are described.

The metadata of ECG scenarios shown in FIGS. 14B and 14C contain description of information for associating two ECG scenarios which constitute the ECG package shown in FIG. 14A with ECG sets which constitute each ECG scenario. In the meta data, information for associating two ECG sets having ECG set IDs "es00001" and "es00002" with the "ECG scenario 1" having an ECG scenario ID "sc00001", and associating two ECG sets having ECG set IDs "es00003" and "es00004" with the "ECG scenario 2" having an ECG scenario ID "sc00002" is described. Detailed description of the metadata is omitted because it is substantially the same as the metadata of the ECG scenario concerning a program shown in FIG. 9A.

The metadata of advertising information shown in FIG. 15A contains description of information for associating the ECG package shown in FIG. 14A with ECG data of advertising information to be associated with the ECG package. In the metadata, "ad00111", "advertisement 1", "maker A", "aaa. jpg", "advertising agency A", and "production A" are described as an advertising information ID, a name, a sponsor name, a logo file, an advertising agency name, and an advertising information production company name, respectively. Further, "Jul. 1, 2007 00:00:00" and "2007/7/20 00:00:00" are described as the provision start date and time and the provision end date and time of advertising information. Furthermore, "item 1", "sweet 1", "foods", "100", and "i1.jpg", are described as a purchase target product ID, a name, a genre, a price and an image file, respectively, for example.

The metadata of the ECG package shown in FIG. 14A contains description for selecting particular program information to be displayed by the receiving terminal 100 for each of programs (ECG scenarios) included in an ECG channel during browsing of the ECG channel, as described in detail later. Specifically, "FLAG" is described as a selection mode. On the other hand, in the metadata of an ECG set shown in FIG. 15B, "TRUE" is described as an ECG package flag in the ECG data (program information) having the content ID "c11". Using such information, during browsing of the ECG channel, the receiving terminal 100 can display the particular ECG data in which the ECG package flag "TRUE" is designated as program information which represents the program.

As the selection mode for selecting program information which represents a program, besides a mode to fixedly set program information for each ECG scenario, a mode to randomly set program information, a mode to set so as to display a plurality of pieces of program information periodically according to the number of times the ECG scenario is displayed and so on may be applied in the same manner.

(ECG Channel)

FIG. 16 is an explanatory view showing the structure of an ECG channel which provides an ECG package. An ECG service provider provides an ECG package to the receiving terminal 100 through an ECG channel which is allocated to the ECG package. The ECG channel is operated and managed by the ECG service provider, and the right to use the ECG channel is allocated to the content provider 300 based on a contract or the like.

FIG. 16 illustrates the case where an ECG service provider operates and manages eight ECG channels, and five ECG channels are allocated to the content providers 300 A to E. For example, the ECG service provider provides an ECG package through the ECG channel 1-1 on 10/2 and provides the same ECG package through the ECG channel 2-1 for the period from 10/1 to 10/4. If a user accesses the ECG server 200 on 10/2, the user can browse the total eight ECG channels 1-1 to 3-1 and A-1 to E-1.

An ECG channel is not used by a fixed user such as a channel of general TV programs or radio programs, but is operated and managed by an ECG service provider so as to be used by varying users relatively freely according to a plan of a program or the like by the ECG service provider or the content providers 300.

(ECG Viewer)

Figure 17:
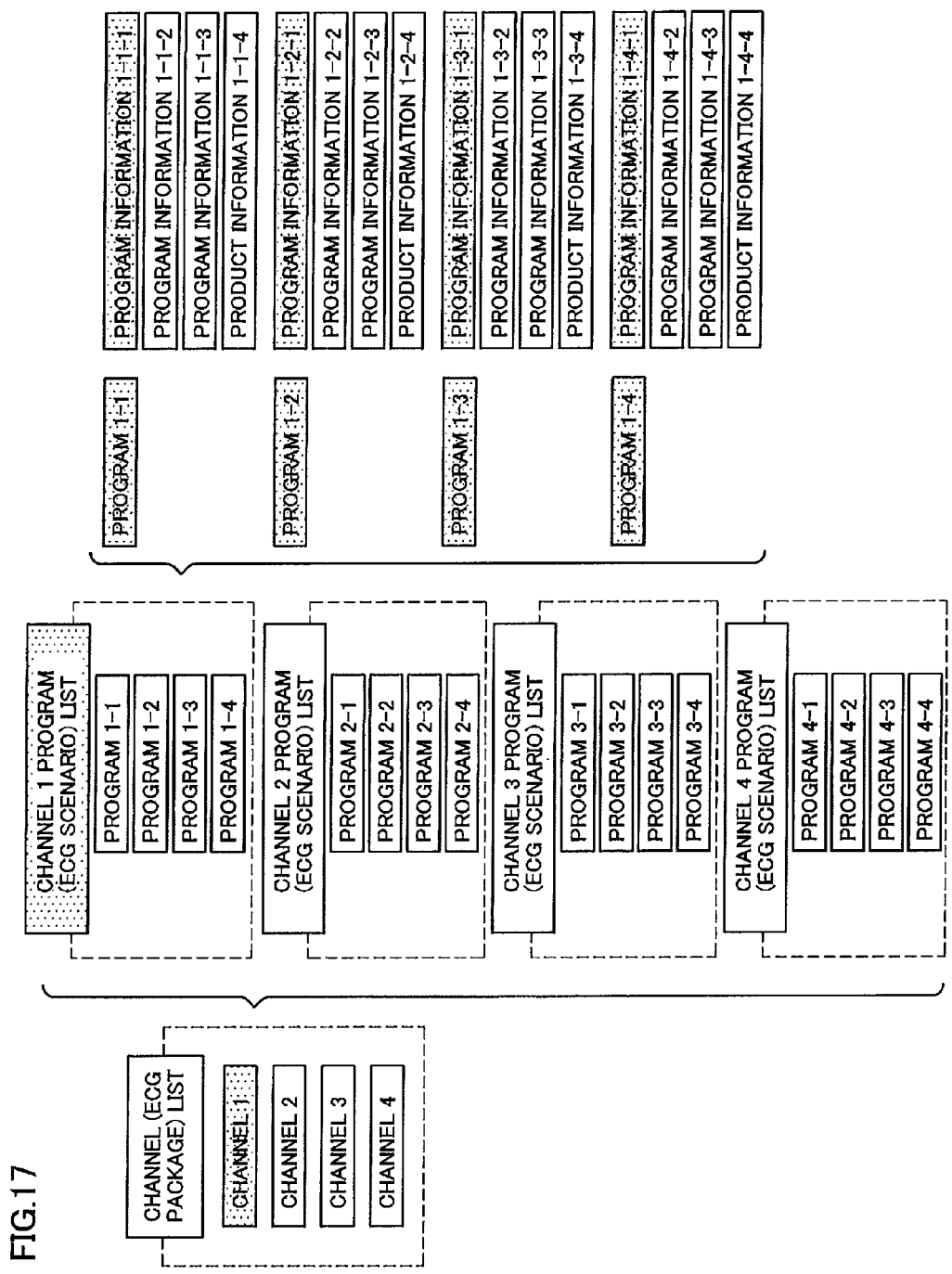
FIG. 17 is an explanatory view showing an example of the structure of information which can be provided to a user via an ECG viewer for browsing information related to a program.

FIG. 17 is an explanatory view showing an example of the structure of information which can be provided to a user via an ECG viewer for browsing information related to a program.

Referring to FIG. 17, an ECG viewer 900 enables browsing of program information and related information which are contained in each program (ECG scenario) in a hierarchical structure of a list of ECG channels (ECG packages) and a list of programs (ECG channels) which are contained in each ECG channel. Although each ECG package contains advertising information which is provided as a part of the ECG package as described earlier, it is omitted in FIG. 17 for convenience of description.

In the example of FIG. 17, the ECG channel list is composed of ECG channels 1 to 4, the ECG channel 1 is composed of programs 1-1 to 1-4, and the program 1-1 is composed of program information 1-1-1 to 1-1-3 and related (product) information 1-1-4.

Figure 18:
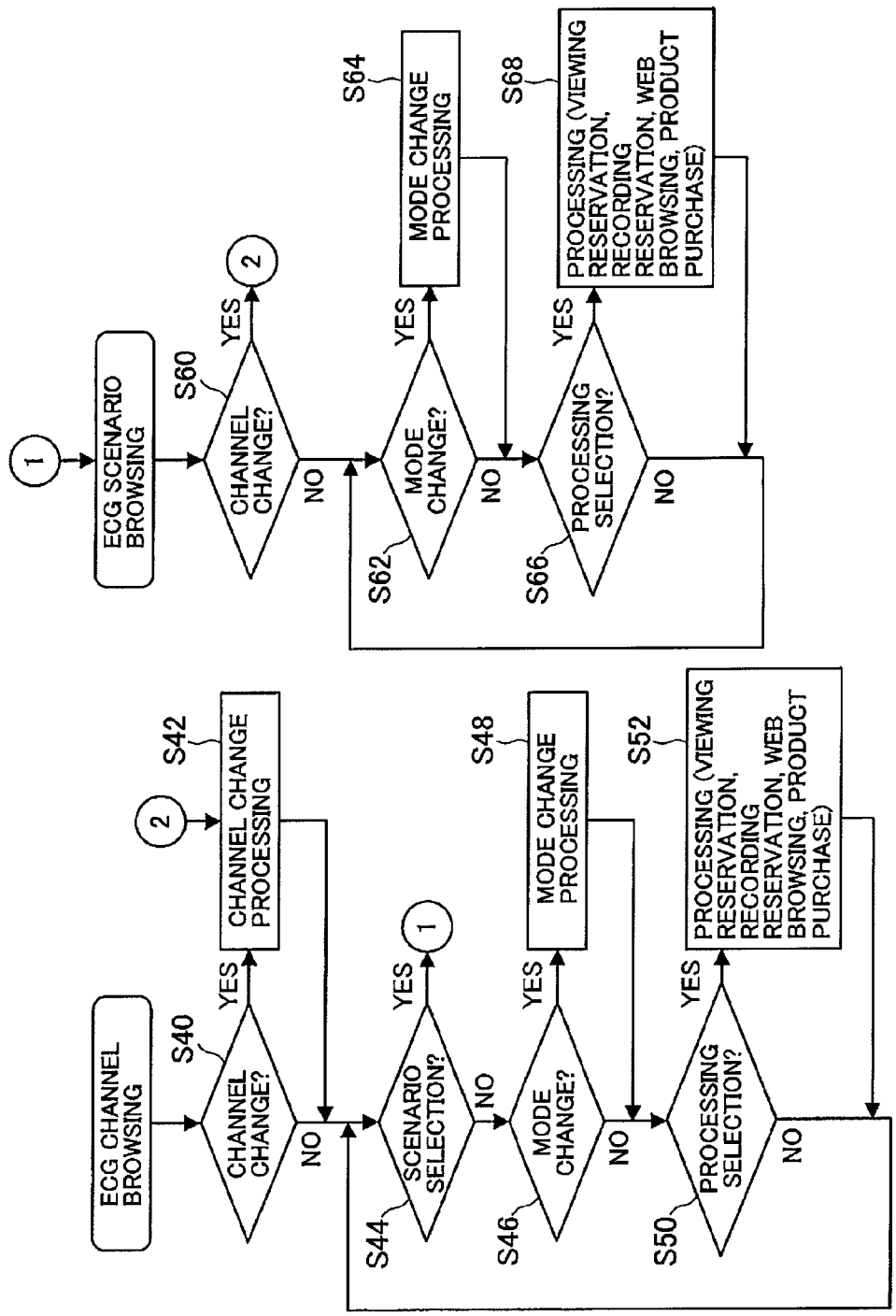
FIG. 18 is a flowchart to explain the function of an ECG viewer.

FIG. 18 is a flowchart to explain the function of an ECG viewer. As shown in FIG. 18, the function mode of the ECG viewer 900 is divided into an ECG channel browsing mode and an ECG scenario browsing mode.

In the ECG channel browsing mode, an ECG channel is changed or selected by operation of a user (Step S40), and channel change processing is performed (S42). Then, particular program information of each program (ECG scenario) which is included in an ECG package that is provided through the ECG channel and advertising information which is associated with the ECG package are displayed sequentially. If a particular program (ECG scenario) is selected by operation of a user (S44), the mode changes into the ECG scenario browsing mode. A display mode (normal/focus) can be changed by operation of a user (S46, S48), as described later. Further, if processing concerning program information and advertising information is selected by operation of a user (S50), processing such as viewing reservation, recording reservation, Web browsing or product purchase is performed (S52).

In the ECG scenario browsing mode, information (program information, related information) of the program (ECG scenario) which is selected in the ECG channel browsing mode are displayed sequentially. In the ECG scenario browsing mode as well, an ECG channel may be changed, and if an ECG channel is changed by operation of a user (S60), the mode changes into the ECG channel browsing mode. A display mode (normal/focus) can be changed by operation of a user (S62, S64). Further, if processing concerning program information and related information is selected by operation of a user (S66), processing such as viewing reservation, recording reservation, Web browsing or product purchase is performed (S68).

Figure 19A:
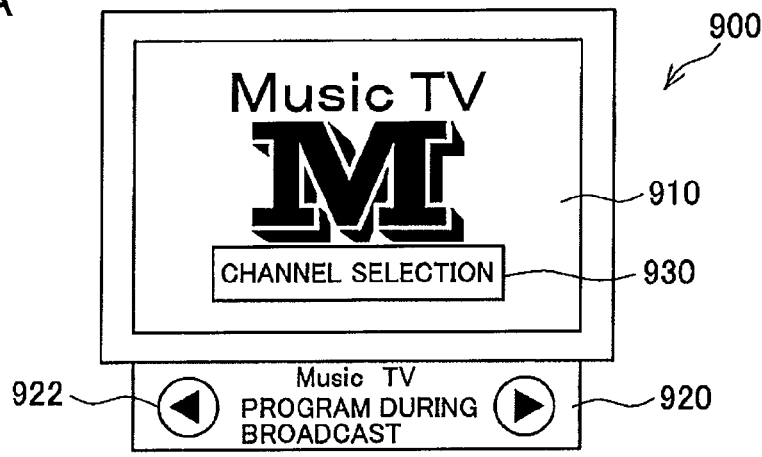
FIG. 19A is an explanatory view showing an example of a display screen of an ECG viewer.

FIGS. 19A to 19C, FIGS. 20A to 20C and FIGS. 21A to 21C are explanatory views showing examples of a display screen of an ECG viewer. For example, the ECG viewer 900 is displayed on the display/playback portion 150 of the receiving terminal 100 or the like by operation of a user, as shown in FIG. 19A. The ECG viewer 900 includes an ECG display frame 910 which displays information related to a program and a current state display frame 920 which displays a currently displayed program, an ECG channel and so on, and a switch button 922 for changing an ECG channel is displayed on the current state display frame 920.

FIG. 19A shows a display screen in the ECG channel browsing mode. In FIG. 19A, particular program information of the program "Music TV" which is included in the ECG channel "program during broadcast" is displayed. Further, a "channel selection" button 930 for selecting an ECG channel to be browsed is displayed. A user can browse a particular ECG channel by changing an ECG channel with the switch button 922 and pressing the "channel selection" button 930.

Figure 19B:
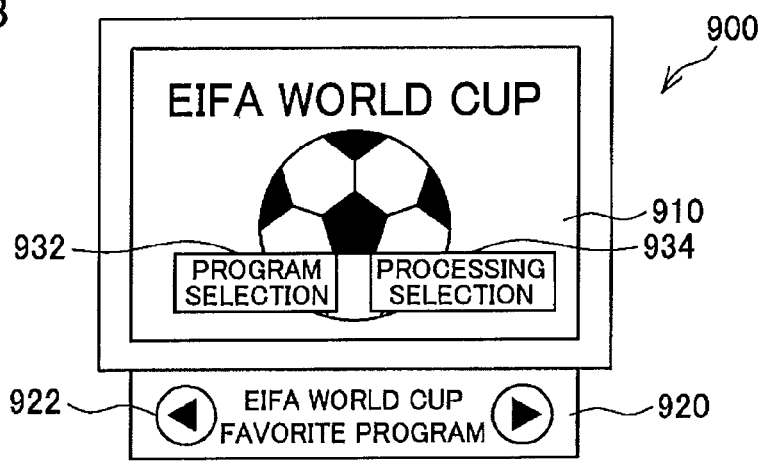
FIG. 19B is an explanatory view showing an example of a display screen of an ECG viewer.

In FIG. 19B, the ECG channel "favorite program" is browsed, and particular program information of the program "EIFA World Cup" which is included in the ECG channel is displayed. Further, a "program selection" button 932 for selecting a program to be browsed and a "processing selection" button 934 for selecting processing, which is described later, regarding information (program information) to be browsed are displayed.

If operation by a user is not performed in this state, particular program information of each ECG scenario which is included in an ECG package that is provided through a currently browsed ECG channel and advertising information which is associated with the ECG package are automatically changed and displayed (normal mode). For example, particular program information and advertising information are automatically changed and displayed such as: program information 1-1-1 of a program 1-1, advertising information A, program information 1-2-1 of a program 1-2, advertising information B, program information 1-3-1 of a program 1-3, and so on. If the "program selection" button 932 is pressed while program information is displayed, a program (ECG scenario) to be browsed is specified, and the mode changes into the ECG scenario browsing mode as shown in FIG. 20B.

Particular program information related to a program refers to representative program information which is contained in each ECG scenario. The representative program information may be one program information or two or more pieces of program information per ECG scenario. Further, the representative program information may be fixedly set for each ECG scenario or randomly set, or may be set so that a plurality of pieces of program information are displayed periodically according to the number of times the ECG scenario is displayed.

Figure 19C:
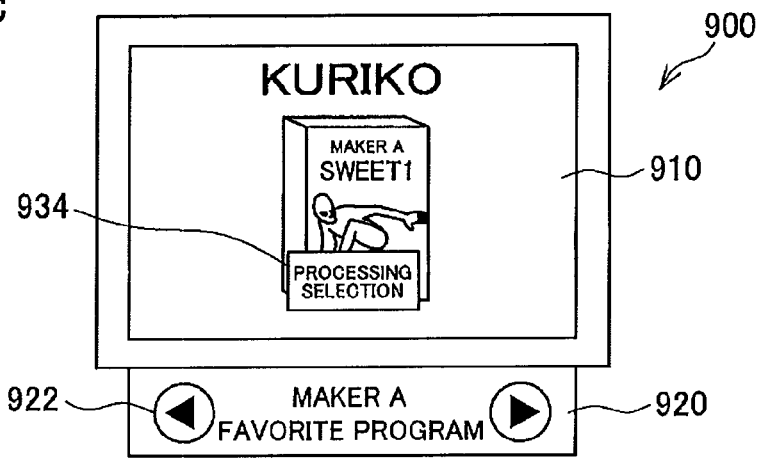
FIG. 19C is an explanatory view showing an example of a display screen of an ECG viewer.

In FIG. 19C, in the ECG channel browsing mode, advertising information of the advertisement "Maker A Sweets 1" which is included in an ECG package is displayed. Further, the "processing selection" button 934 for selecting processing regarding information (advertising information) to be browsed is displayed.

Figure 20A:
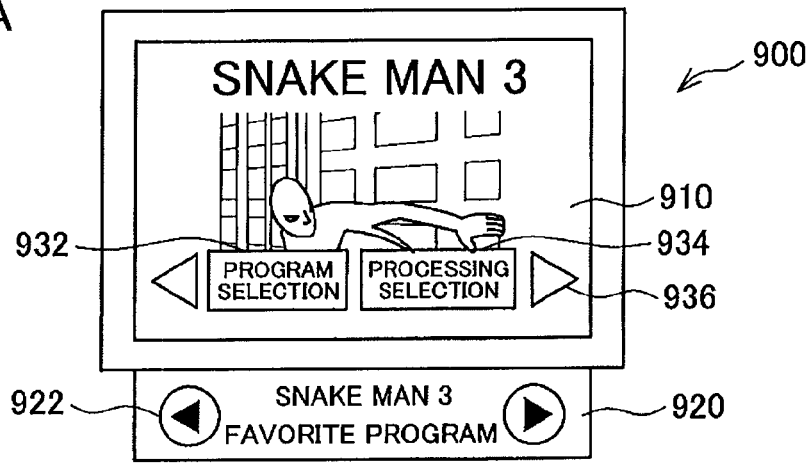
FIG. 20A is an explanatory view showing an example of a display screen of an ECG viewer.
Figure 20B:
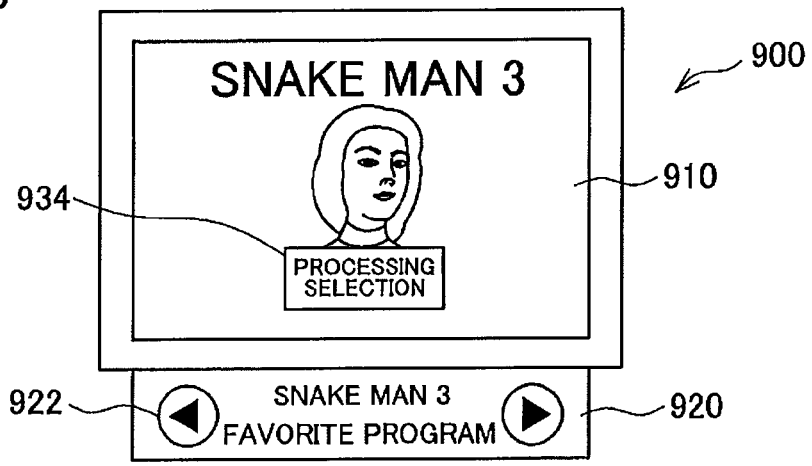
FIG. 20B is an explanatory view showing an example of a display screen of an ECG viewer.

In FIG. 20A, the display mode is changed from the normal mode to the focus mode by operation of a user, and program information of the program "Snake man 3" which is included in the ECG package is displayed. Further, the "program selection" button 932 for selecting a program to be browsed, the "processing selection" button 934 for selecting processing regarding information (program information) to be browsed, and a switch button 936 for changing information to be displayed are displayed.

In the focus mode, particular program information and advertising information are changed and displayed by operation of the switch button 936 by a user, rather than being changed and displayed automatically. If the "program selection" button 932 is pressed in the state where the program information is displayed, a program (ECG scenario) to be browsed is specified, and the mode changes into the ECG scenario browsing mode as shown in FIG. 20B.

FIG. 20B shows a display screen in the ECG scenario browsing mode. In FIG. 20B, program information of the program "Snake man 3" which is selected in the ECG channel browsing mode is displayed. Further, the "processing selection" button 934 for selecting processing regarding information (program information, related information) to be browsed is displayed.

If operation by a user is not performed in this state, information (program information, related information) which are included in the selected program (ECG scenario) are automatically changed and displayed (normal mode). For example, information which is included in the selected ECG scenario are automatically changed and displayed such as: program information 1-1-1, program information 1-1-2, program information 1-1-3, program information 1-1-4 of a program 1-1, and so on. Alternatively, information which are included in the ECG scenario may be changed and displayed according to the priorities which are set to program information and/or related information as shown in FIG. 7. If the "processing selection" button 934 is pressed, selection of processing regarding information (program information, related information) to be browsed becomes available.

In the ECG scenario browsing mode as well, display in the focus mode is possible as in the ECG channel browsing mode. If the display mode is changed into the focus mode by operation of a user, the "processing selection" button 934 for selecting processing regarding information (program information, related information) to be browsed and the switch button 936 for changing information to be displayed are displayed as shown in FIG. 20A. In the focus mode, information (program information, related information) to be browsed are changed and displayed by operation of the switch button 936 by a user, rather than being changed and displayed automatically. Then, if the "processing selection" button 934 is pressed, selection of processing becomes available.

As described earlier, in the ECG channel browsing mode and the ECG scenario browsing mode, if the "processing selection" button 934 is pressed when program information or related information (including advertising information) is displayed, selection of processing becomes available. Then, processing such as program viewing reservation, program recording reservation, Web browsing of information related to a program or product purchase is selected by operation of a user according to the information being displayed. An example of the processing is described below.

FIG. 20C and FIGS. 21A to 21C show display screens of various processing in the ECG channel browsing mode and the ECG scenario browsing mode. In FIG. 20C and FIGS. 21A to 21C, program information or related information (including advertising information) of the program "LAST" which is included in the ECG channel "favorite program" are displayed.

Figure 20C:
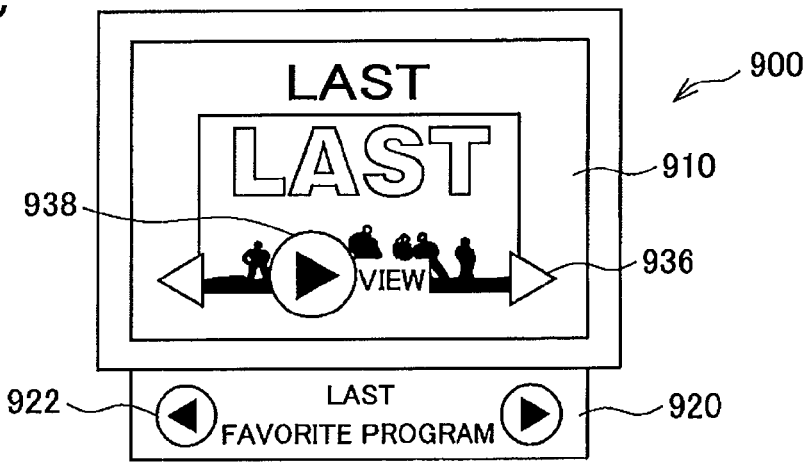
FIG. 20C is an explanatory view showing an example of a display screen of an ECG viewer.

In FIG. 20C, program viewing reservation processing is selected by operation of a user, and a "VIEW" mark 938 which indicates selection of viewing reservation processing and the switch button 936 for selecting a program for viewing reservation are displayed. When the viewing reservation processing is selected, viewing reservation is performed based on program scheduling information which is contained in an ECG scenario related to the selected program in the receiving terminal 100 which has a video playback function or the receiving terminal 100 which is connected to a video playback device.

Figure 21A:
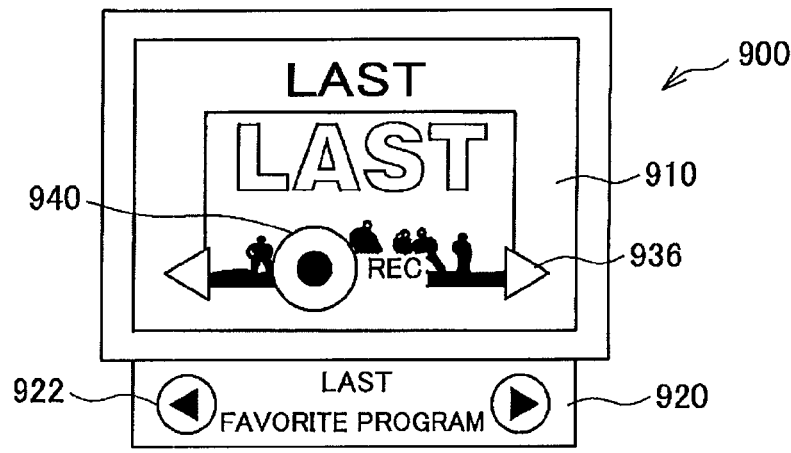
FIG. 21A is an explanatory view showing an example of a display screen of an ECG viewer.

In FIG. 21A, program recording reservation processing is selected by operation of a user, and a "REC" mark 940 which indicates selection of recording reservation processing and the switch button 936 for selecting a program for recording reservation are displayed. When the recording reservation processing is selected, recording reservation is performed based on program scheduling information which is contained in an ECG scenario related to the selected program in the receiving terminal 100 which has a video recording function or the receiving terminal 100 which is connected to a video recording device.

Figure 21B:
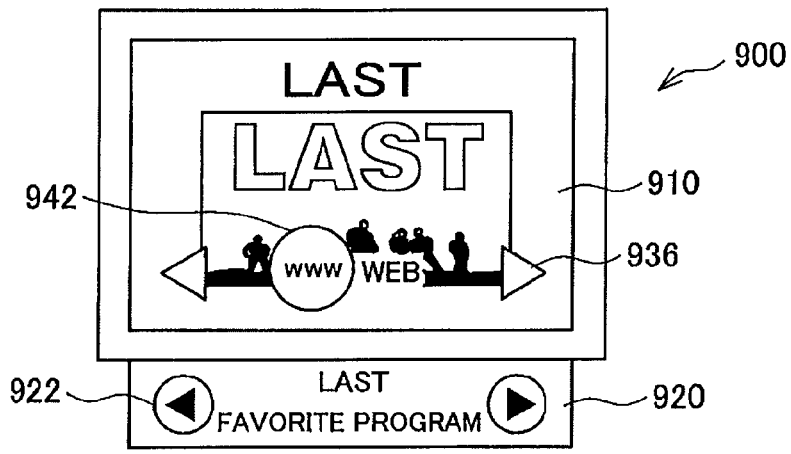
FIG. 21B is an explanatory view showing an example of a display screen of an ECG viewer.

In FIG. 21B, Web browsing processing is selected by operation of a user, and a "WEB" mark 942 which indicates selection of Web browsing processing and the switch button 936 for selecting information (program information, related information) which is linked to the Web are displayed. When the Web browsing processing is selected, Web browsing processing is performed based on link information or the like which is contained in the selected information in the receiving terminal 100 which has a Web browsing function or the receiving terminal 100 which is connected to an information processing device having a Web browsing function.

Figure 21C:
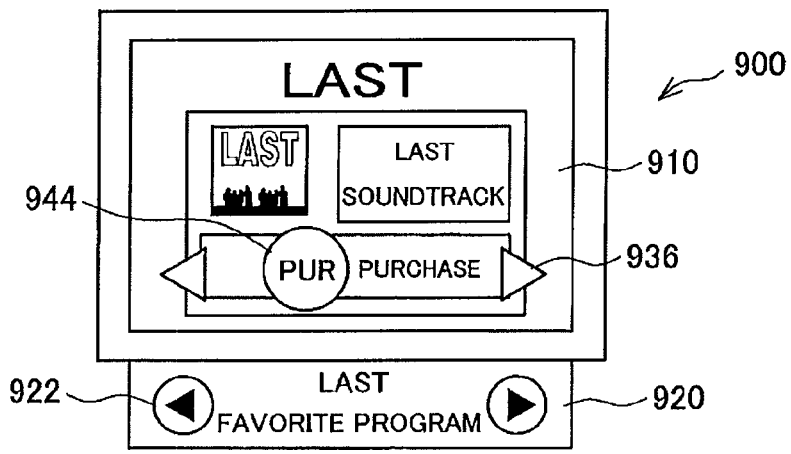
FIG. 21C is an explanatory view showing an example of a display screen of an ECG viewer.

In FIG. 21C, product purchase processing is selected by operation of a user, and a "PURCHASE" mark 944 which indicates selection of product purchase processing and the switch button 936 for selecting information (related information) as a target of product purchase processing are displayed. When the product purchase processing is selected, product purchase processing is performed based on link information or the like which is contained in the selected information in the receiving terminal 100 which has a Web browsing function or the receiving terminal 100 which is connected to an information processing device having a Web browsing function.

(Production and Management Flow of ECG Package)

Figure 22:
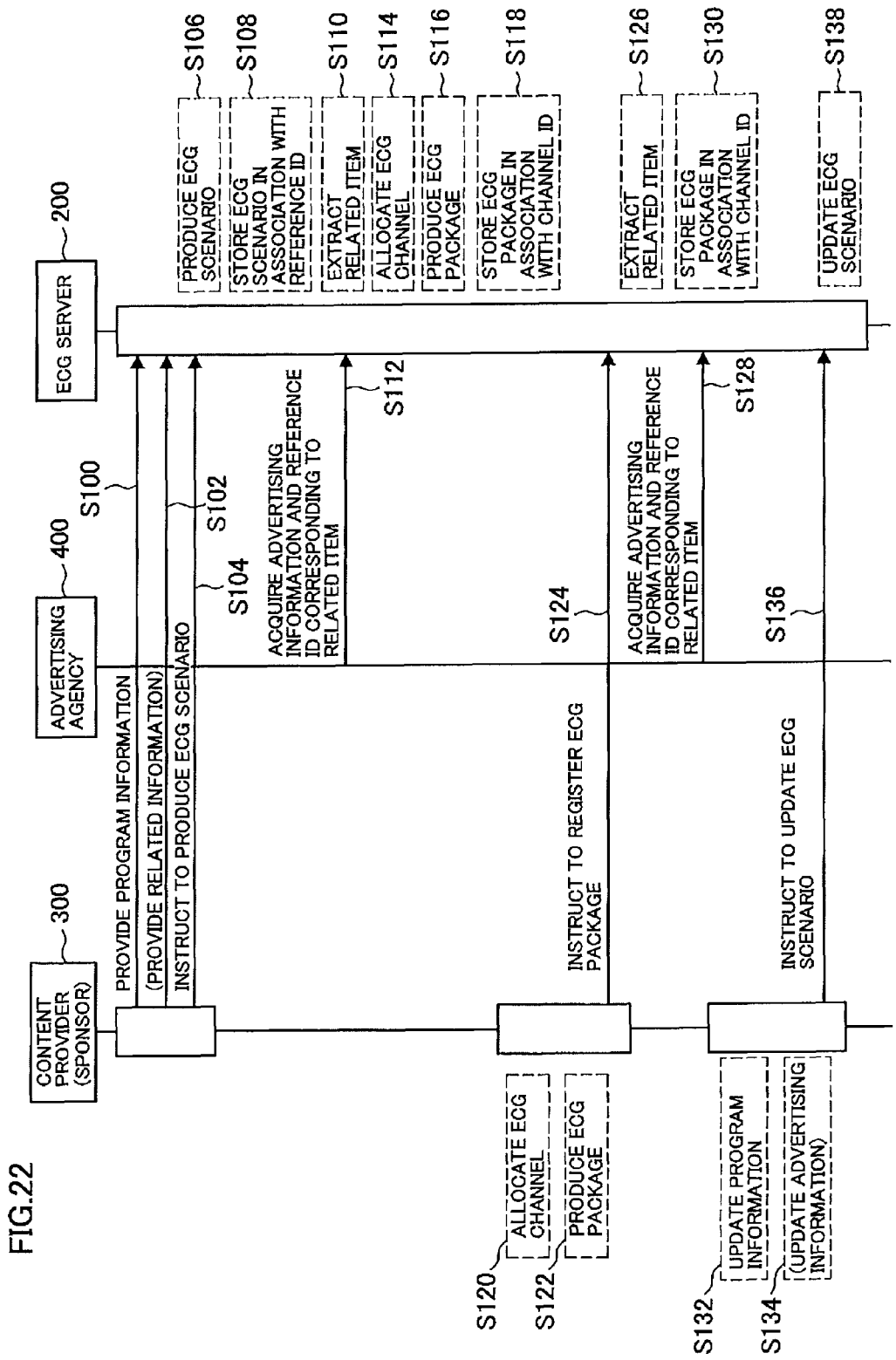
FIG. 22 is a sequence chart showing an example of a flow of production and management of an ECG package in an information providing system as a whole.

FIG. 22 is a sequence chart showing an example of a flow of production and management of an ECG package in an information providing system as a whole.

The content provider 300 and the sponsor 400 provide program information and related information to the ECG server 200 (Step S100, S102), and the content provider 300 instructs the ECG server 200 to produce an ECG scenario (S104). In response to the instruction from the content provider 300, the ECG server 200 produces an ECG scenario (S106) and stores the ECG scenario in association with a reference ID into the ECG scenario database system 230 (S108).

Then, the ECG server 200 extracts a common related item, such as a keyword of a program, for a plurality of programs having a relationship with each other which are provided as an ECG package from the ECG scenarios related to the programs (S110). Further, the ECG server 200 acquires advertising information which are appropriate for the related item and their reference IDs from the advertising information database system 410 (S112). The ECG server 200 then sorts out advertising information to be associated with the ECG package from the acquired advertising information.

After that, the ECG server 200 allocates an ECG channel to provide an ECG package to the ECG package (S114). Then, the ECG server 200 produces an ECG package which contains a discrimination ID of the ECG channel, reference IDs of ECG scenarios related to a plurality of programs, and a reference ID of advertising information associated with the ECG package (S116). The ECG server 200 then stores the produced ECG package in association with the discrimination ID of the ECG channel into the ECG package database system 240 (S118).

On the other hand, in the case of producing an ECG package by the content provider 300, the content provider 300 allocates an ECG channel to an ECG package of a plurality of programs having a relationship with each other (S120) and produces an ECG package (S122). Then, the content provider 300 provides the ECG package to the ECG server 200 and instructs it to register the ECG package (S124). Receiving the instruction to register the ECG package, the ECG server 200 extracts a common related item from the ECG scenarios related to a plurality of programs (S126) and acquires a reference ID of advertising information which is appropriate for the related item from the advertising information database system 410 (S128). Then, the ECG server 200 stores the ECG package in association with the discrimination ID of the ECG channel into the ECG package database system 240 (S130).

After that, if program information or advertising information is updated (S132, S134), the content provider 300 or the sponsor 400 instructs the ECG server 200 to update the ECG scenario (S136). In response to the update instruction, the ECG server 200 updates the ECG scenario which is stored in the ECG scenario database system 230 (S138).

(Provision Flow of ECG Package)

Figure 23:
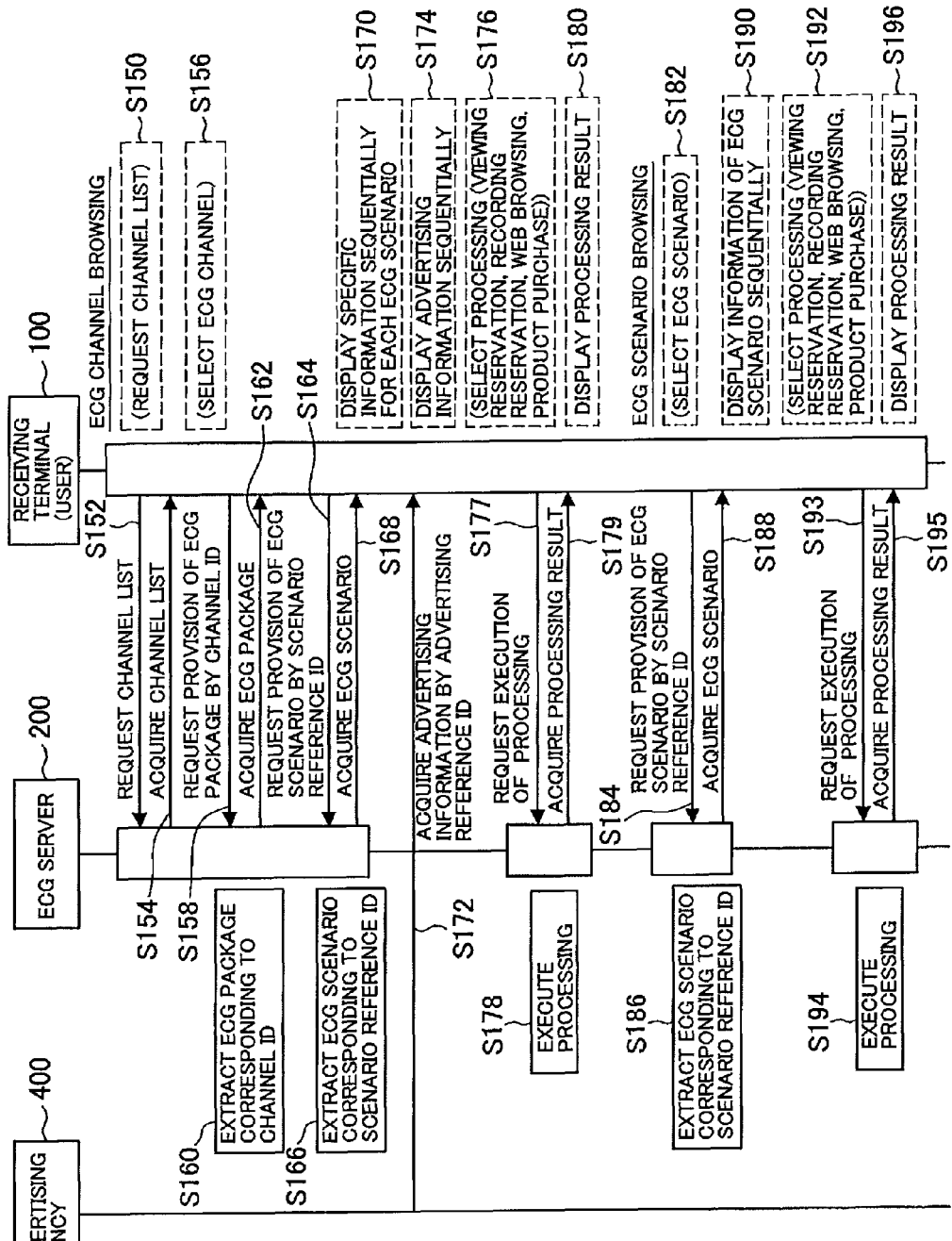
FIG. 23 is a sequence chart showing an example of a flow of provision of information related to a program in an information providing system as a whole.

FIG. 23 is a sequence chart showing an example of a flow of provision of information related to a program in an information providing system as a whole.

When acquisition of a channel (ECG package) list is requested by a user (Step S150), the receiving terminal 100 requests provision of a channel list to the ECG server 200 (S152) and acquires the channel list from the ECG server 200 (S154).

Instead of that all ECG channels which are included in the channel list are exhibited by the receiving terminal 100, the ECG channels which include programs that match preference of a user may be automatically sorted by the receiving terminal 100 and exhibited to the user. In such a case, a user previously records information which can identify favorite programs such as a program genre and keyword regarding favorite programs as preference information into the receiving terminal 100. Then, the receiving terminal 100 sorts out the ECG channels which include programs (ECG scenarios) that match the preference information of the user from the ECG channel list based on the ECG scenarios and exhibits the sorted ECG channels to the user. The user can thereby select and browse a desired ECG channel from the ECG channels which are sorted so as to match the user's preference.

When a particular ECG channel is selected by a user from the ECG channel list (S156), the receiving terminal 100 requests provision of a particular ECG package to the ECG server 200 based on the discrimination ID of the ECG channel (S158).

Instead of that a particular ECG channel is selected by a user, an ECG channel which includes a program that matches preference of a user may be automatically selected by the receiving terminal 100. In such a case, the receiving terminal 100 retrieves the ECG channel which includes a program (ECG scenario) that matches preference of a user from the channel list and automatically changes the ECG channel. A user can thereby browse a desired ECG channel without performing channel selection operation.

When provision of an ECG package is requested, the ECG server 200 extracts the ECG package which corresponds to the discrimination ID of the ECG channel from the ECG package database system 240 (S160). The receiving terminal 100 acquires the appropriate ECG package from the ECG server 200 for browsing of the ECG channel by a user (S162).

After the ECG package is acquired, the receiving terminal 100 requests provision of an ECG scenario to the ECG server 200 based on the reference ID of the ECG scenario which is contained in the ECG package (S164). Receiving the request for provision of an ECG scenario, the ECG server 200 extracts the ECG scenario which corresponds to the reference ID of the ECG scenario from the ECG scenario database system 230 (S166). The receiving terminal 100 acquires the ECG scenario from the ECG server 200 (S168) and displays particular program information which is contained in the ECG scenario sequentially for each ECG scenario (S170).

Further, the receiving terminal 100 acquires advertising information which corresponds to the reference ID of the advertising information which is contained in the ECG package from the advertising information database system 410 (S172). The receiving terminal 100 then displays the acquired advertising information sequentially together with particular program information contained in the ECG scenario (S174).

Then, when execution of processing such as viewing reservation, recording reservation, Web browsing and product purchase is selected by a user in relation to displayed information (program information, advertising information) (S176), the receiving terminal 100 executes the selected processing by itself or requests execution of the selected processing (S178) to the ECG server 200. Then, the receiving terminal 100 displays a result of processing which is executed by itself or a result of processing acquired from the ECG server 200 (S180).

Next, when a particular ECG scenario which is included in the ECG package is selected by a user (S182), the receiving terminal 100 requests provision of the ECG scenario to the ECG server 200 based on the reference ID of the ECG scenario (S184). Receiving the request for provision of the ECG scenario, the ECG server 200 extracts the ECG scenario which corresponds to the reference ID of the ECG scenario from the ECG scenario database system 230 (S186). The receiving terminal 100 acquires the ECG scenario from the ECG server 200 for browsing of the ECG scenario by a user (S188).

After the ECG scenario is acquired, the receiving terminal 100 displays information (program information, related information) which are contained in the ECG scenario sequentially (S190). Then, the receiving terminal 100 performs processing such as viewing reservation, recording reservation, Web browsing and product purchase by itself or requests execution to the ECG server 200 in response to operation by a user in relation to displayed information (program information, advertising information) (S192 to S196), as in the ECG channel browsing mode.

In the ECG channel browsing mode and the ECG scenario browsing mode, a user can browse displayed information such as program information and related information (including advertising information) by changing a display mode (normal/focus).

As described in the foregoing, in the information providing system according to an embodiment of the present invention, a user can acquire an ECG package through a particular ECG channel and efficiently browse a plurality of ECG scenarios related to a plurality of programs based on reference IDs of ECG scenarios which are included in the ECG package. On the other hand, the content provider 300 can make the ECG server 200 provide an ECG package through a particular ECG channel and effectively provide a plurality of ECG scenarios related to a plurality of programs to a user based on reference IDs of ECG scenarios which are included in the ECG package.

Further, a user can acquire an ECG package through a particular ECG channel and efficiently browse advertising information associated with a plurality of programs based on a reference ID of advertising information which is included in the ECG package. On the other hand, the content provider 300 can make the ECG server 200 provide an ECG package through a particular ECG channel and effectively provide advertising information associated with a plurality of programs to a user based on a reference ID of advertising information which is included in the ECG package.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the case where a plurality of ECG scenarios related to a plurality of programs having a relationship with each other are provided as an ECG package is described in the above-described embodiment. Although it is assumed to produce ECG scenarios in association with programs in this case, there are cases where ECG scenarios are produced in association with a chapter video and/or a digest video in which a particular program video constituting a program is edited. In such cases, ECG scenarios related to a chapter video and/or a digest video in which a program video constituting each program is edited regarding a plurality of programs having a relationship with each other may be provided as an ECG package. A user can thereby efficiently browse a plurality of ECG scenarios related to a particular program video constituting each program regarding a plurality of programs. Further, a content provider can effectively provide a plurality of ECG scenarios related to a particular program video constituting each program to a user regarding a plurality of programs.

What is claimed is:

1. An information providing apparatus connected with an information receiving terminal that acquires information related to a plurality of programs via a communication network, the information providing apparatus providing information related to a program to the information receiving terminal, the information providing apparatus comprising:

circuitry configured to
    store scenario information related to a program of the plurality of programs in association with reference information,
    store plural package information, each package information associated, without user input, with a channel allocated to the respective package information and including reference information of a plurality of pieces of scenario information, each piece of scenario information related to a different one of the plurality of programs and having a relationship with other pieces of scenario information and with advertising information included in the respective package information, each one of the stored plural package information including reference information of the plurality of pieces of scenario information and reference information of the advertising information organized in a display sequence, the display sequence indicating an order in which the plurality of pieces of scenario information and the advertising information are to be displayed on the information receiving terminal as the respective package information,
    acquire identification information of a particular channel allocated to package information from the information receiving terminal, extract the package information associated with the particular channel, and provide the extracted package information to the information receiving terminal and
    acquire reference information of particular scenario information included in the extracted package information from the information receiving terminal, extract scenario information corresponding to the acquired reference information, and provide the extracted scenario information to the information receiving terminal, wherein
    the information providing apparatus is connected with an advertising information managing apparatus to store advertising information to be provided as a part of the package information in association with reference information via a communication network,
    the circuitry stores reference information of the advertising information in order for the information receiving terminal to acquire particular advertising information from the advertising information managing apparatus based on the reference information of the advertising information included in the package information acquired by the information receiving terminal, and
    the circuitry is further configured to
    extract a common related keyword from the plurality of pieces of scenario information related to the plurality of programs, and
    store, in an advertising information database system, reference information of advertising information corresponding to the related item in association with identification information of the channel allocated to the package information.

2. The information providing apparatus according to claim 1, wherein the circuitry is further configured to:
    produce the package information in order to provide a collection of information related to the plurality of programs having a relationship with each other as the package information.

3. The information providing apparatus according to claim 1, wherein the circuitry stores the package information produced by a program provider.

4. The information providing apparatus according to claim 1, wherein the circuitry stores reference information of the plurality of pieces of scenario information related to the plurality of programs provided from different program providers in association with identification information of the channel allocated to the package information.

5. The information providing apparatus according to claim 1, wherein the circuitry is further configured to:
    manage a channel allocated to the package information.

6. The information providing apparatus according to claim 1, wherein the scenario information is edited so that a plurality of pieces of information related to a program are displayed sequentially.

7. An information receiving terminal connected with an information providing apparatus that stores scenario information related to a plurality of programs in association with reference information and stores plural package information, each package information associated, without user input, with a channel allocated to the respective package information and including reference information of a plurality of pieces of scenario information, each piece of scenario information related to a different one of the plurality of programs and having a relationship with other pieces of scenario information and with advertising information included in the respective package information, each one of the stored plural package information including reference information of the plurality of pieces of scenario information and reference information of the advertising information organized in a display sequence, the display sequence indicating an order in which the plurality of pieces of scenario information and the advertising information are to be displayed on the information receiving terminal as the respective package information, to acquire information related to the plurality of programs from the information providing apparatus, the information receiving terminal comprising:
    circuitry configured to
    acquire the package information provided through a particular channel allocated to package information from the information providing apparatus based on identification information of the channel,
    acquire particular scenario information from the information providing apparatus based on reference information of the scenario information included in the acquired package information, and
    control display of acquired information, wherein
    the information providing apparatus is connected with an advertising information managing apparatus to store advertising information to be provided as a part of the package information in association with reference information via a communication network,
    the information providing apparatus stores reference information of the advertising information in order for the information receiving terminal to acquire particular advertising information from the advertising information managing apparatus based on the reference information of the advertising information included in the package information acquired by the information receiving terminal, and
    the information providing apparatus is configured to
    extract a common related keyword from the plurality of pieces of scenario information related to the plurality of programs, and
    store, in an advertising information database system, reference information of advertising information corresponding to the related item in association with identification information of the channel allocated to the package information.

8. The information receiving terminal according to claim 7, wherein
the information receiving terminal further includes circuitry to acquire particular advertising information from the advertising information managing apparatus based on reference information of the advertising information included in the acquired package information.

9. The information receiving terminal according to claim 7, wherein
a plurality of pieces of package information are provided by the information providing apparatus through a plurality of channels, and
the information receiving terminal further includes circuitry to select a particular channel from the plurality of channels.

10. The information receiving terminal according to claim 7, further comprising:
circuitry configured to
store preference information of a user, and
sort out a channel to provide package information corresponding to the preference information based on the scenario information included in the package information.

11. The information receiving terminal according to claim 7, wherein
the scenario information includes a plurality of pieces of information related to a program, and particular information of the plurality of pieces of information included in the scenario information is preset as information representing the scenario information, and
the circuitry controls display of acquired information so as to sequentially display information representing each scenario information of the plurality of pieces of scenario information and the advertising information included in package information in the sequence included in package information provided through a particular channel.

12. The information receiving terminal according to claim 7, wherein the scenario information is edited so that a plurality of pieces of information related to a program are displayed sequentially.

13. An information providing system where an information providing apparatus that provides information related to a plurality of programs and an information receiving terminal that acquires information related to the plurality of programs from the information providing apparatus are connected via a communication network, wherein
the information providing apparatus includes circuitry configured to:
store scenario information related to a program of the plurality of programs in association with reference information,
store plural package information, each package information associated, without user input, with a channel allocated to the respective package information and including reference information of a plurality of pieces of scenario information, each piece of scenario information related to a different one of the plurality of programs and having a relationship with other pieces of scenario information and with advertising information included in the respective package information, each one of the stored plural package information including reference information of the plurality of pieces of scenario information and reference information of the advertising information organized in a display sequence, the display sequence indicating an order in which the plurality of pieces of scenario information and the advertising information are to be displayed on the information receiving terminal as the respective package information,
acquire identification information of a particular channel allocated to package information from the information receiving terminal, extract the package information associated with the particular channel, and provide the extracted package information to the information receiving terminal, and
acquire reference information of particular scenario information included in the extracted package information from the information receiving terminal, extract scenario information corresponding to the acquired reference information, and provide the extracted scenario information to the information receiving terminal, and
the information receiving terminal includes circuitry configured to:
acquire the package information provided through a particular channel from the information providing apparatus based on identification information of the channel,
acquire particular scenario information from the information providing apparatus based on reference information of the scenario information included in the acquired package information, and
control display of acquired information, wherein
the information providing apparatus is connected with an advertising information managing apparatus to store advertising information to be provided as a part of the package information in association with reference information via a communication network,
the information providing apparatus stores reference information of the advertising information in order for the information receiving terminal to acquire particular advertising information from the advertising information managing apparatus based on the reference information of the advertising information included in the package information acquired by the information receiving terminal, and
the information providing apparatus is further configured to
extract a common related keyword from the plurality of pieces of scenario information related to the plurality of programs, and
store, in an advertising information database system, reference information of advertising information corresponding to the related item in association with identification information of the channel allocated to the package information.

14. The information providing system according to claim 13, wherein
the information receiving terminal further includes circuitry configured to acquire particular advertising information from the advertising information managing apparatus based on the reference information of the advertising information included in the acquired package information.

15. An information providing method applied to an information providing system where an information providing apparatus that provides information related to a plurality of programs and an information receiving terminal that acquires information related to the plurality of programs from the information providing apparatus are connected via a communication network, the method being performed by the information providing apparatus and comprising:
storing scenario information related to a program of the plurality of programs in association with reference information;

storing plural package information, each package information associated, without user input, with a channel allocated to the respective package information and including reference information of a plurality of pieces of scenario information, each piece of scenario information related to a different one of the plurality of programs and having a relationship with other pieces of scenario information and with advertising information included in the respective package information, each one of the stored plural package information including reference information of the plurality of pieces of scenario information and reference information of the advertising information organized in a display sequence, the display sequence indicating an order in which the plurality of pieces of scenario information and the advertising information are to be displayed on the information receiving terminal as the respective package information;

acquiring identification information of a particular channel allocated to package information from the information receiving terminal, extracting the package information associated with the particular channel, and providing the extracted package information to the information receiving terminal; and acquiring reference information of particular scenario information included in the extracted package information from the information receiving terminal, extracting scenario information corresponding to the acquired reference information, and providing the extracted scenario information to the information receiving terminal, wherein the information providing apparatus is connected with an advertising information managing apparatus to store advertising information to be provided as a part of the package information in association with reference information via a communication network, the information providing apparatus stores reference information of the advertising information in order for the information receiving terminal to acquire particular advertising information from the advertising information managing apparatus based on the reference information of the advertising information included in the package information acquired by the information receiving terminal, and the information providing apparatus is further configured to extract a common related keyword from the plurality of pieces of scenario information related to the plurality of programs, and store, in an advertising information database system, reference information of advertising information corresponding to the related item in association with identification information of the channel allocated to the package information.

16. A non-transitory computer-readable storage medium storing instructions, which, when executed by an information providing apparatus connected with an information receiving terminal that acquires information related to a plurality of programs via a communication network, causes the information providing apparatus to execute a method of providing information related to the plurality of programs to the information receiving terminal, the method comprising:

storing scenario information related to a program of the plurality of programs in association with reference information;

storing plural package information, each package information associated, without user input, with a channel allocated to the respective package information and including reference information of a plurality of pieces of scenario information, each piece of scenario information related to a different one of the plurality of programs and having a relationship with other pieces of scenario information and with advertising information included in the respective package information, each one of the stored plural package information including reference information of the plurality of pieces of scenario information and reference information of the advertising information organized in a display sequence, the display sequence indicating an order in which the plurality of pieces of scenario information and the advertising information are to be displayed on the information receiving terminal as the respective package information;

acquiring identification information of a particular channel allocated to package information from the information receiving terminal, extracting the package information associated with the particular channel, and providing the extracted package information to the information receiving terminal; and acquiring reference information of particular scenario information included in the extracted package information from the information receiving terminal, extracting scenario information corresponding to the acquired reference information, and providing the extracted scenario information to the information receiving terminal, wherein the information providing apparatus is connected with an advertising information managing apparatus to store advertising information to be provided as a part of the package information in association with reference information via a communication network, the information providing apparatus stores reference information of the advertising information in order for the information receiving terminal to acquire particular advertising information from the advertising information managing apparatus based on the reference information of the advertising information included in the package information acquired by the information receiving terminal, and the information providing apparatus is further configured to extract a common related keyword from the plurality of pieces of scenario information related to the plurality of programs, and store, in an advertising information database system, reference information of advertising information corresponding to the related item in association with identification information of the channel allocated to the package information.

17. A non-transitory computer-readable medium storing instructions, which, when executed by an information receiving terminal connected with an information providing apparatus that stores scenario information related to a program of a plurality of programs in association with reference information and stores plural package information, each package information associated, without user input, with a channel allocated to the respective package information and including reference information of a plurality of pieces of scenario information, each piece of scenario information related to a different one of the plurality of programs and having a relationship with other pieces of scenario information and with advertising information included in the respective package information, each one of the stored plural package information including reference information of the plurality of pieces of scenario information and reference information of the advertising information organized in a display sequence, the display sequence indicating an order in which the plurality of pieces of scenario information and the advertising information are to be displayed on the information receiving terminal as the respective package information, causes the information receiving terminal to execute a method of acquiring information related to the plurality of programs from the information providing apparatus, where scenario information related to a program of the plurality of programs is stored in association with reference information by the information providing apparatus, and package information including reference information of a plurality of pieces of scenario information, each piece of scenario information related to one of the plurality of programs is stored in association with identification information of a channel allocated to the package information by the information providing apparatus in order to provide a collection of information related to the plurality of programs having a relationship with each other as package information, the method comprising:

acquiring package information provided through a particular channel allocated to package information from the information providing apparatus based on identification information of the channel;

acquiring particular scenario information from the information providing apparatus based on reference information of the scenario information included in the acquired package information; and controlling display of acquired information, wherein the information providing apparatus is connected with an advertising information managing apparatus to store advertising information to be provided as a part of the package information in association with reference information via a communication network, the information providing apparatus stores reference information of the advertising information in order for the information receiving terminal to acquire particular advertising information from the advertising information managing apparatus based on the reference information of the advertising information included in the package information acquired by the information receiving terminal, and the information providing apparatus is further configured to extract a common related keyword from the plurality of pieces of scenario information related to the plurality of programs, and store, in an advertising information database system, reference information of advertising information corresponding to the related item in association with identification information of the channel allocated to the package information.

\* \* \* \* \*